United States Patent [19]

Clark et al.

[11] Patent Number: 4,813,767
[45] Date of Patent: Mar. 21, 1989

[54] SURFACE STABILIZED FERROELECTRIC LIQUID CRYSTAL DEVICES

[76] Inventors: Noel A. Clark, 3106 Kittrell Ct., Boulder, Colo. 80303; Sven T. Lagerwall, 30 Snackvagen, Goteborg, Sweden

[21] Appl. No.: 88,482

[22] Filed: Aug. 19, 1987

Related U.S. Application Data

[60] Continuation of Ser. No. 797,021, Nov. 12, 1985, abandoned, which is a division of Ser. No. 511,733, Jul. 7, 1983, Pat. No. 4,563,059, which is a continuation-in-part of Ser. No. 456,844, Jan. 10, 1983, abandoned, which is a continuation of Ser. No. 110,451, Jan. 8, 1980, Pat. No. 4,367,924.

[51] Int. Cl.$^4$ .............................................. G02F 1/137
[52] U.S. Cl. .................................. 350/341; 350/350 S
[58] Field of Search ............................ 350/350 S, 341

[56] References Cited

U.S. PATENT DOCUMENTS

| 1,647,320 | 11/1927 | Thomas | 350/114 X |
|---|---|---|---|
| 3,687,515 | 8/1972 | Haas et al. | 350/347 E X |
| 3,796,999 | 3/1974 | Kahn . | |
| 3,814,501 | 6/1974 | Schindler | 350/338 |
| 3,833,287 | 9/1974 | Taylor | 350/349 |
| 3,881,809 | 5/1975 | Fergason | 350/338 |
| 3,883,227 | 5/1975 | Kobayashi et al. | 350/336 |
| 3,989,355 | 11/1976 | Wilmer . | |
| 4,128,313 | 12/1978 | Cole et al. . | |
| 4,139,273 | 2/1979 | Crossland et al. | 350/350 S X |
| 4,235,525 | 11/1980 | Berman et al. | 350/349 X |
| 4,252,414 | 2/1981 | Kinugawa et al. . | |
| 4,277,144 | 7/1981 | Saurer . | |
| 4,294,516 | 10/1981 | Brooks . | |
| 4,367,924 | 1/1983 | Clark et al. | 350/346 X |
| 4,443,062 | 4/1984 | Togashi et al. | 350/335 |
| 4,563,059 | 1/1986 | Clark et al. | 350/350 S X |

FOREIGN PATENT DOCUMENTS

2023866  1/1980  United Kingdom ................. 350/341

OTHER PUBLICATIONS

Iwasaki et al, "Color Switching in Ferroelectric Smectic Liquid Crystal by Electric Field", JPN J. Appl. Phys., vol. 18 (1979) No. 12.

Yoshino et al, "New Electro-Optical Effects in Ferroelectric Liquid Crystals", *Japanese Journal of Applied Physics*, vol. 18, 1979, Supp. 18-1, pp. 427–433.

Iwasaki et al, "Color Switching in Ferroelectric Smectic Liquid Crystals by Electric Field", Jpn. J. Appln. Phys. 1979, pp. 2323–2324.

R. B. Meyer, "Ferroelectric Liquid Crystals: A Review", Mol. Cryst. 1977, pp. 33–48.

Brunet et al, "Defaults dans les Smectiques C Chiraux", Ann. Phys., vol. 3, 1978, pp. 237–247.

R. B. Meyer et al, "Ferroelectric Liquid Crystals", *Le Journal de Physique*, vol. 36, Mar. 1975, pp. L-69-L-71.

Martinot-Lagarde, "Observation of Ferroelectrical Monodomains in the Chiral Smectic C Liquid Crystals", *Le Journal de Physique*, Colloq., vol. 37, 1976, pp. C3-129 through C3-132.

Martinot-Lagarde, "Direct Electrical Measurement of the Permanent Polarization of a Ferroelectric Chiral Smectic C Liquid Crystal", *Le Journal de Physique*, vol. 38, Jan. 1977, pp. L-17 through L-19.

(List continued on next page.)

*Primary Examiner*—Stanley D. Miller
*Assistant Examiner*—David Lewis
*Attorney, Agent, or Firm*—Cushman, Darby & Cushman

[57] ABSTRACT

A liquid crystal device including a ferroelectric liquid crystal disposed between plates treated to enforce a particular ferroelectric molecular orientation to the plates. The devices employ alone or in combination non-planar boundary conditions, polar boundary conditions, boundaries with multiple physical states, intrinsic spontaneous splay distortion of the polarization orientation field, combined ferroelectric and dielectric torques, layers tilted with respect to the plates. The plates are spaced by a distance sufficiently small to ensure unwinding of the helix typical in a bulk of the material to form either monostable, bistable or multistable states which exhibit novel electro-optic properties. The liquid crystal is responsive to an externally applied electric field, temperature or the like to make a light valve or other electro-optical device.

47 Claims, 12 Drawing Sheets

OTHER PUBLICATIONS

Takezoe et al, "Birefringence in the Sm A Phase and the Disappearance of Helicoidal Structure in the Sm C Phase Caused by an Electric Field in DOBAMBC", *Japanese Journal of Applied Physics*, vol. 17, No. 7, Jul. 1978, pp. 1219-1224.

Brunet et al, "Defauts dans les Smectiques C Chiraux", Ann. Phys., vol. 3, No. 2-3-4, 1978, pp. 237-247.

Meyer, "Liquid Crystals for Magneticians: Ferroelectric Liquid Crystals", *IEEE Transactions on Magnetics*, vol. MAG-12, No. 6, Nov. 1976, p. 788.

Young et al, "Light Scattering Study of Two-Dimensional Molecular-Orientation Fluctuations in a Freely Suspended Ferroelectric Liquid-Crystal Film,"*Physical Review Letters*, vol. 40, No. 12, Mar. 1978, pp. 773-776.

Pelzl et al, "Tilt Angle Determination of A Smectic C Phase by Field-Induced Freedericksz Transistion and X Ray Investigations", *Molecular Crystals and Liquid Crystals*, vol. 53, No. ¾, 1979, pp. 167-179.

Simova et al., "Coherent Light Diffraction in A Smectic C Liquid Crystal", *Molecular Crystals and Liquid Crystals*, vol. 42, 1977, pp. 295-305.

Ostrovskii et al, "Ferroelectric Properties of Smectic Liquid Crystals", JETP, vol. 25, No. 2, Jan. 20, 1977, pp. 70-72.

Yoshino et al, "Electro-Optical Effect of Ferroelectric Smectic Smectic Liquid Crystal", *Japanese Journal of Applied Physics*, vol. 17, No. 3, 1978, pp. 597-598.

Anderson, "Ferroelectrics in Optical Memories and Displays: A Critical Appraisal," *IEEE Transactions, Sonics and Ultrasonics*, SU-19, vol . 3, 1972, pp. 69-79.

Hoffmann et al, "Dielectric Study of Ferroelectric Properties and Chiral Smectic C", *Molecular Crystals and Liquid Crystals*, vol. 8, 1977.

Anderson, "Optical Applications of Ferroelectrics", Ferroelectrics, vol. 7, 1974, pp. 55-63.

P. Keller et al, "Synthese et mesomorphisme de quelques p-alkyloxybenzylidene, p'-aminocinnamates de R(-)chloro-2 propyle", *Comptes Rendus des Seances de l'Academie des Sciences*, vol. 282, serie C, Apr. 5, 1976, pp. 639-641.

Ostrovski et al, "Linear Electro-Optical Effect in a Ferroelectric Smectic Liquid Crystal", Fiz. Tverd. Tela 21(3), 1979, pp. 917-920.

K. Kondo et al, Japanese Journal of Applied Physics, vol. 20, pp. 1773-1777, 1981.

M. Brunet, Le Journal de Physique, vol. 36, pp. Cl, 321-324, 1975.

P. Keller et al, Le Journal de Physique, vol. 37, pp. C3-C27, 1976.

J. Doucet et al, Le Journal de Physique, vol. 39, pp. 548-553, 1978.

G. Ryschenkov & M. Kleman, Journal of Chemical Physics, vol. 64, pp. 404-412, 1976.

E. Dubois-Violette and P. G. deGennes, Le Journal de Physique, vol. 36, pp. L255-L258, 1975.

M. Glogarova, "MBBA on Triglycine Sulphate", Le Journal de Physique, vol. 42, pp. 1569-1574, 1981.

M. Kleman, Points. Lignes. Parois, Les Editions de Physique, Orsay, 1978, pp. 165-171.

C. E. Wiliams & M. Kleman, Le Journal de Physique, vol. 35, pp. L33-L37, 1974.

D. Armitage, Journal of Applied Physics, vol. 52, pp. 1294-1300 (1981).

N. A. Clark, M. A. Handschy, & S. T. Lagerwall, Molecular Crystals and Liquid Crystals, vol. 94, pp. 213-234, 1983.

T. Uchida et al, Proceedings of the 1982 International Display Research Conference, SID/IEEE, pp. 166-170, 1982.

R. A. Soref, Optics Letters, vol. 4, pp. 155-157, 1979.

R. A. Soref et al, Optics Letters, vol. 5, 147-149, 1980.

Yoshino et al., "Electrical and Optical Properties of Ferroelectric Smectic Liquid Crystal and its Application", pp. 115-120, 1977.

Yoshino et al., "Synthesis of Ferroelectric Liquid and Its Electrical Properties", pp. 6-12, 1980.

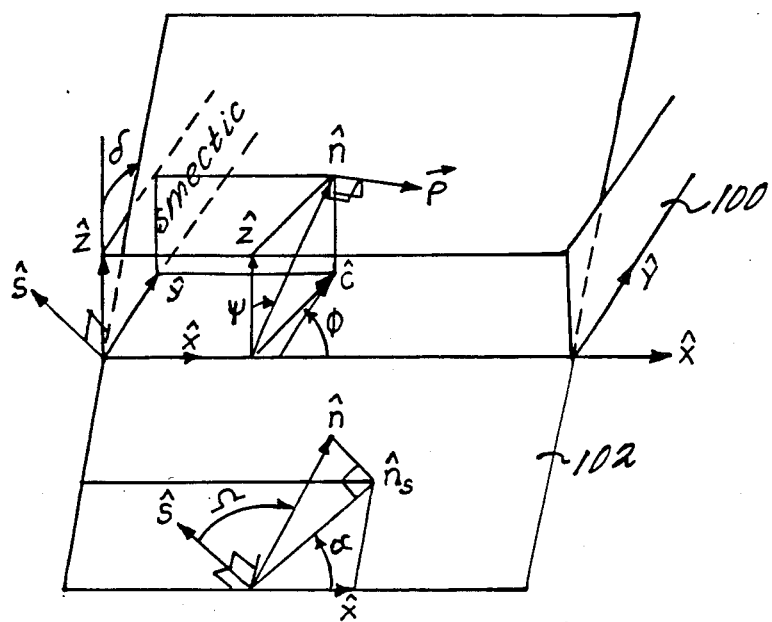
FIG. 1
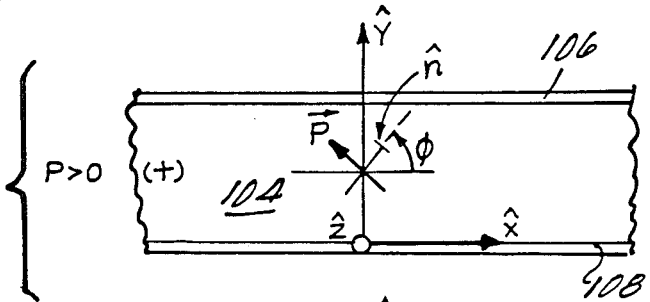
FIG. 2a
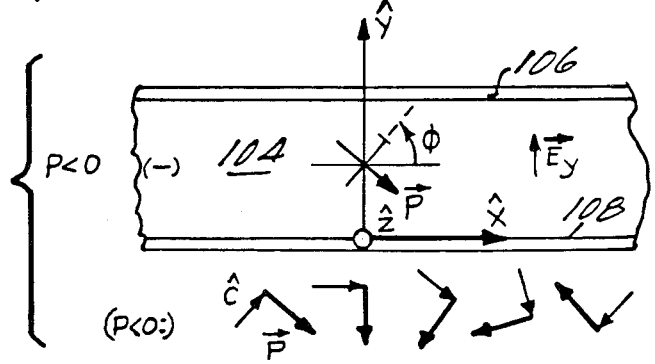
FIG. 2b
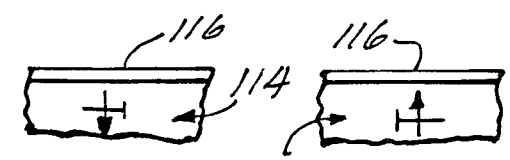
FIG. 6a  FIG. 6b

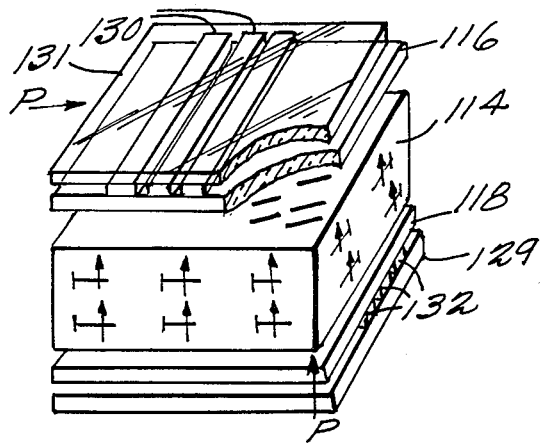
FIG. 16
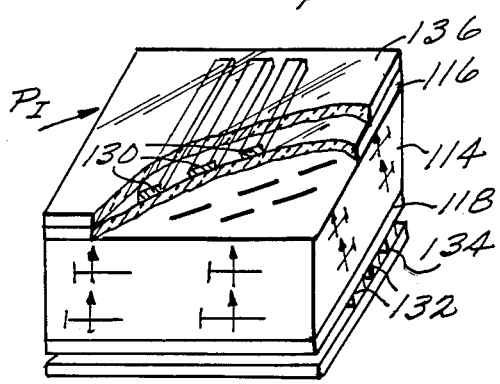
FIG. 17
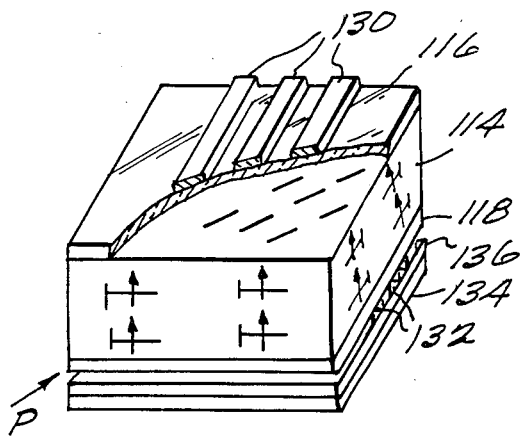
FIG. 19
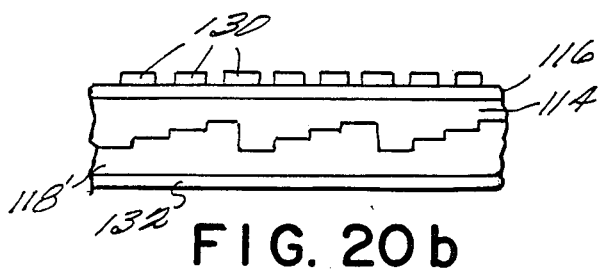
FIG. 20a
FIG. 20b
FIG. 20c
FIG. 20d

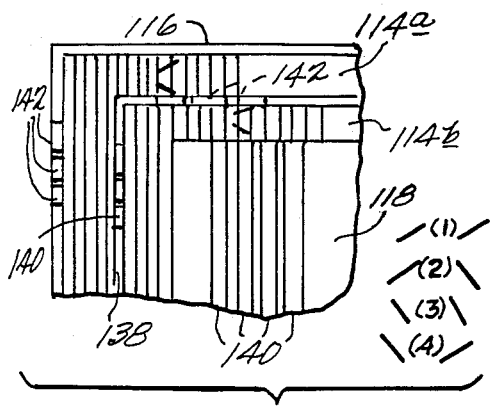
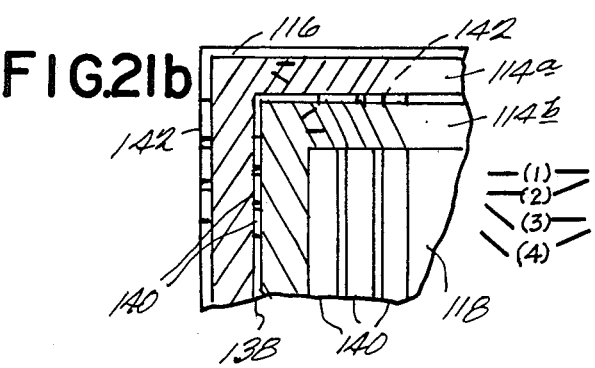
FIG.21a
FIG.21b
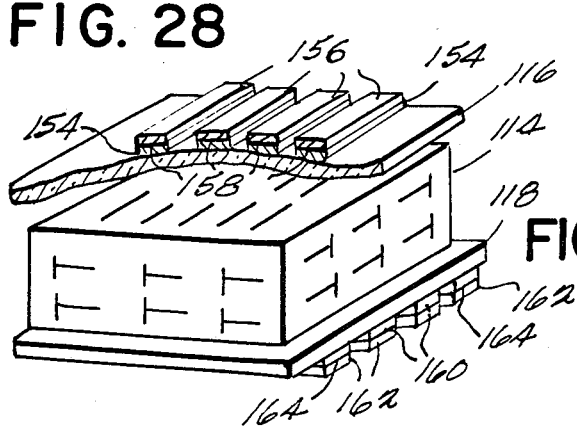
FIG. 28
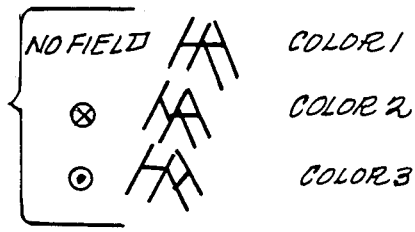
FIG.22a
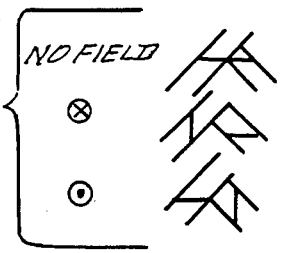
FIG.22b
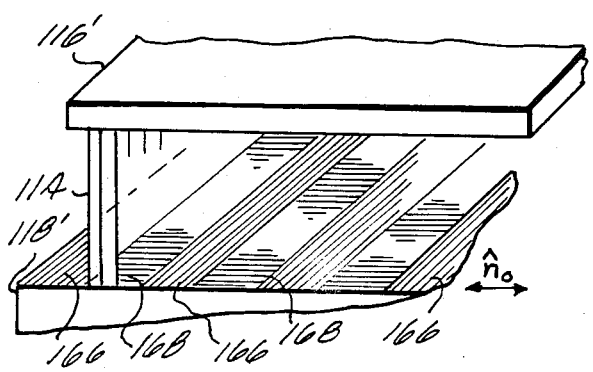
FIG. 29
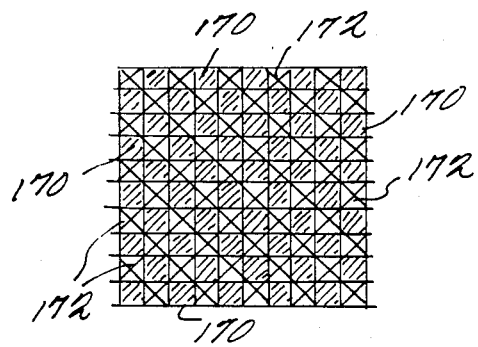
FIG. 30

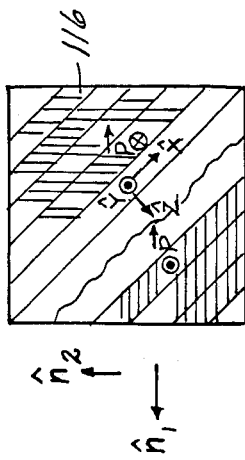
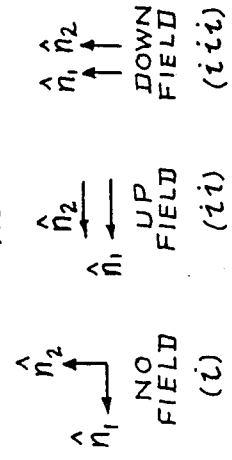
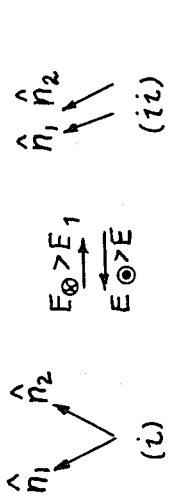
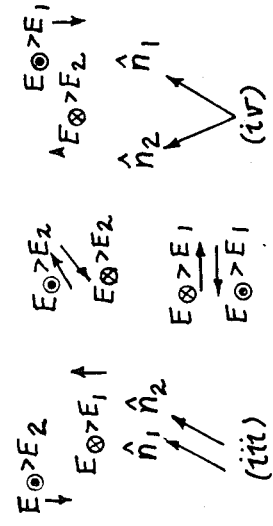
FIG. 24a
FIG. 24b
FIG. 23

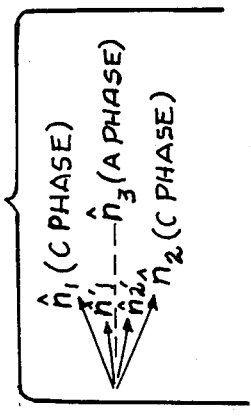
FIG. 27a
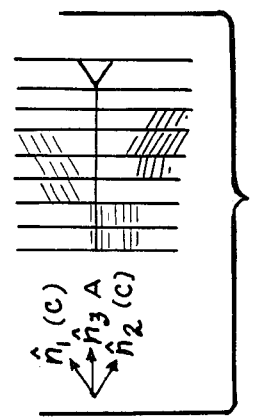
FIG. 27b
FIG. 25
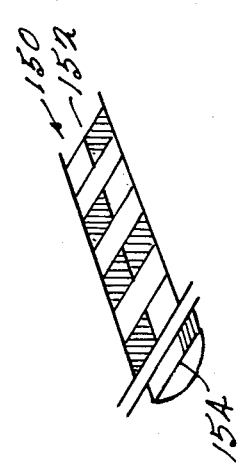
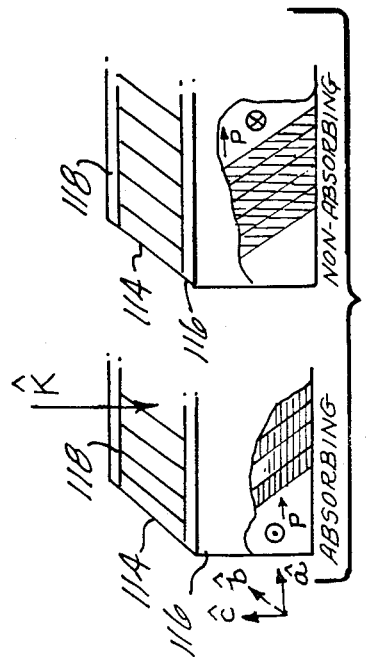
FIG. 26a
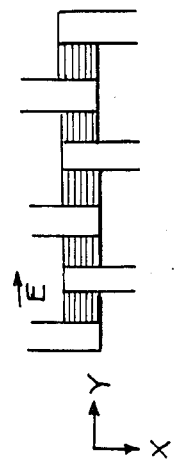
FIG. 26b

SURFACE STABILIZED FERROELECTRIC LIQUID CRYSTAL DEVICES

This is a continuation of Ser. No. 797,021, filed 11/12/85, now abandoned, which is a divisional of Ser. No. 511,733, filed 7/7/83, now U.S. Pat. No. 4,563,059 which is a continuation-in-part of Ser. No. 456,844, filed 1/10/83, now abandoned, which is a continuation of Ser. No. 110,451, filed 1/8/80, now U.S. Pat. No. 4,563,059.

I. BACKGROUND OF THE INVENTION

A. Field of the Invention

This application relates to liquid crystal devices, particularly devices employing ferroelectric liquid crystals.

B. U.S. Pat. No. 4,367,924

In U.S. Pat. No. 4,367,924 (hereinafter "said patent"), the contents of which are incorporated herein by reference, a liquid crystal electro-optic device is described employing a chiral smectic C or H ferroelectric liquid crystal. In that device the liquid crystal is disposed between parallel plates with the planar smectic layers normal to the plates (see said patent, FIG. 2). These smectics are characterized by an average molecular long axis direction, indicated by the molecular director, $\hat{n}$, which is constrained, in equilibrium, to make some temperature dependent angle, $\Psi_o$, with the normal to the layers, but which is free to take up any value of the angle $\phi$ which gives the orientation of $\hat{n}$ about the layer normal. Typically $\Psi_o$, which is a property of the bulk smectic, is in the range from 0° to about 45°. The ferroelectric polarization, $\vec{P}$, reorients with $\hat{n}$, always remaining locally normal to $\hat{n}$ and lying parallel to the plane of the layers, as shown in FIGS. 1 and 2 of said patent.

In the device described in said patent, the plates were treated so that the molecules near the plates would adopt an orientation having the average molecular long axis direction parallel to the plane of the plates but free to adopt any orientation within that plane. That is, the molecular director, $\hat{n}$, is constrained at the surface to lie in the surface plane. This condition, when combined with the additional constraint that the director make the angle $\Psi_o$ with the normal to the layers (see said patent, FIG. 2), leads to a geometry in which, if the plates are sufficiently close together, the intrinsic helical configuration of $\hat{n}$ which is present in the bulk will be suppressed, leaving two surface stabilized states of the molecular orientation configuration, each having the ferroelectric polarization normal to the plates but in opposite directions (see said patent, FIG. 2). Devices such as this, which employ surface interactions to stably unwind the spontaneous ferroelectric helix, will be referred to as Surface Stabilized Ferroelectric Liquid Crystal (SSFLC) devices.

The device of said patent exhibits several novel features which distinguish it from other liquid crystal devices:

(1) Optic axis rotation about the sample normal - A ferroelectric smectic in this geometry behaves optically as a biaxial slab with the optic axes nearly along the director orientation. The biaxiality is generally weak, so the behavior is essentially uniaxial with the uniaxis along the director. The effect of switching is to rotate the uniaxis about the normal to the surface through an angle of twice the tilt angle $\Psi_o$. This is the only liquid crystal parallel-plate geometry allowing a rotation of the uniaxis of a homogeneous sample about the surface normal.

(2) Strong-weak boundary conditions - Another unique feature to be noted is the nature of the required boundary condition. In order to obtain bistability, boundary conditions which constrain the molecules to be parallel to the plates but allow several or continuous orientations about the normal to the plates are required. The device of said patent is the first liquid crystal electro-optic structure to employ such a combination of strong and weak boundary conditions. A consequence of this feature and an essential property of the structure is that the director at the surfaces is switched between stable surface orientation states as an intrinsic part of the overall switching process. The SSFLC is the first liquid crystal electro-optic structure wherein switching between stable surface states has been demonstrated and the first case in which ferroelectric liquid crystal domains have been made to appear.

(3) A significantly higher switching speed - As a result of having the helix unwound, it is the first ferroelectric liquid crystal device to achieve the minimum, intrinsic response time for molecular reorientation to a changing electric field, since, with the helix unwound, bulk reorientation can occur without the motion of topological defects in the orientation field.

C. Achieving Layer and Director Alignment

An indispensable requirement necessary to make a practical electro-optic device using the surface stabilized ferroelectric liquid crystal geometry is to achieve, in the ferroelectric smectic phase, both the desired director boundary condition and the desired layer orientation in a uniform fashion over the entire active device area. Boundary conditions influencing the director orientation at the surface are established by specific surface preparations. Possible boundary conditions and their properties in the surface stabilized ferroelectric liquid crystal geometry are discussed in detail in the next section. Uniform layer orientation, on the other hand, must be established by some specific step appropriately controlling the growth or arrangement of the smectic layers in the process of fabricating the liquid crystal cell.

Excluding the geometry having the liquid crystal layers parallel to the plates, which is not of relevance to this application, there are only three ways demonstrated in the art of achieving uniform layer orientation of a smectic C or a tilted smectic crystal. The first are the well-known anisotropic surface treatment techniques of rubbing or oblique SiO evaporation, combined with the smectic A - C transition, as reviewed by K. Kondo et al in the Japanese Journal of Applied Physics, Volume 20, pp. 1773–1777, 1981. The other two are the combination of external shear and the smectic A - C transition described in said patent, and the combination of magnetic field and the smectic A - C transition, also described in said patent and since reported by K. Kondo et al, op. cit. Using the nematic to smectic C transition has not proven successful in achieving homogeneous layer alignment, since even the strong surface planar alignment provided by oblique evaporation of silicon monoxide, which fixes the director orientation in space, produces two different layer orientations in distinct regions, as has been demonstrated by M. Brunet, *Le Journal de Physique*, Volume 36, pp. Cl, 321–324, 1975, and G. Peltzl et al., *Molecular Crystals and Liquid Crystals*, Volume 53, 167–180, 1979.

All of the above-mentioned treatments involve ordering in one phase and cooling into the smectic C phase. They involve a combination of processes and are thus complicated compared to, for example, the alignment process for twisted nematic cells, which requires only surface treatment. It would be desirable to have available processes for alignment of layers in ferroelectric smectics which involve only surface treatment (and perhaps the use of a phase transition) which provide controllable surface orientation characteristics for the director in the ferroelectric smectic phase. In Section X E, techniques are discussed for layer orientation of ferroelectric liquid crystals and a novel method is introduced involving two kinds of boundary condition, one acting upon the director, the other upon the layer.

D. Ferroelectric Liquid Crystals

In said patent, an electro-optic device employing a ferroelectric smectic C or H liquid crystal was described. The features of these ferroelectric phases essential to the operation of the device are: (1) they are smectics in which the rod-shaped molecules are arranged into layers with the director tilted at some angle relative to the normal to the layers; (2) the molecules are chiral, producing, according to the arguments of Meyer et al (*Le Journal de Physique*, Volume 36, pp., L69-71, 1975), a bulk ferroelectric dipole moment, P, normal to ñ. The chiral compounds discussed in the original application, DOBAMBC and HOBACPC, have several tilted smectic - and therefore ferroelectric - phases, two of which were identified at the time of the application: the smectic C phase over some temperature range and, at lower temperatures, a phase which we described as smectic H in accord with the identifications made by the group that synthesized the compounds (P. Keller et al, *Le Journal de Physique*, Volume 37, pp. C3-27, 1976). However, other data (J. Doucet, et al, *Le Journal de Physique*, Volume 39, pp. 548-553, 1978) suggested that there are at least two phases below the smectic C in HOBACPC, a smectic F (now called smectic I) adjacent to the C, and a smectic H at lower temperatures. More recent heat capacity studies by the inventors confirm the latter data. The nomenclature of the various tilted smectic phases has been subject to some changes in the last two years and both their crystallographic identification and nomenclature is in a state of considerable flux.

The presently adopted distinction among the five ferroelectric smectic phases now identified with certainty—smectics C,F,G,H,I—is as follows. The smectic C phase is the most fluid, having normal liquid state order within a given layer, i.e., local positional order involving only a few molecules. The smectic F and I phases have considerably more order in a given plane, with typically hundreds of molecules grouped into local quasi-crystalline regions. This leads to an orientational viscosity of the smectic F and I which is about 100 times that of the smectic C. The smectic F and I are distinguished by the different orientation of the tilt direction relative to the local crystal lattice direction. The smectic G and H phases are much more strongly ordered, with nearly long range (quasi-crystalline) translational ordering in a given layer, and very high viscosities. New subdivisions of the G and H classes, necessitating the further denominations J and K, have recently been proposed.

However, the crystallographic details of internal ordering add nothing new in principle. All chiral tilted smectics are ferroelectric and although the original application discussed specifically the smectic C and H phases (now identified as C and I in HOBACPC and C and F in DOBAMBC), we point out here that devices like that of said patent or like those to be described in this application may employ any o these ferroelectric phases and operate in essentially the same fashion. There will be qualitative features of the various phases that will dictate which to use in a particular situation. For example, as one proceeds from the least to the most strongly ordered, the electro-optic switching may become slower but with improved stability (memory, threshold) characteristics of the switching. Also, as the correlation between smectic layers grows stronger, the helix pitch will increase (becoming infinite in the limit of sufficiently strong ordering), allowing thick samples to be switched bistably.

II. SUMMARY OF THE INVENTION

In this application, new ferroelectric liquid crystal devices are described which have the same basic SSFLC geometry as that of said patent, i.e., a ferroelectric smectic liquid crystal introduced between plates such that: (1) the electric polarization can couple to an electric field applied across the plates. This imp that the layers are planar and normal to a specific direction over the entire sample, and that they make some angle substantially greater than zero with the bounding plates. In the device of said patent they were perpendicular to the bounding plates, but this application goes beyond the condition of strict perpendicularity for certain purposes to allow a well-defined and specified tilt; (2) the liquid crystal layer is sufficiently thin that surface interactions stably unwind the intrinsic helix.

These new devices differ from that of said patent in that they employ, alone or in combination: NON-PLANAR boundary conditions; POLAR boundary conditions; boundaries with multiple physical states; intrinsic spontaneous splay distortion of the polarization orientation field; combined ferroelectric and dielectric torques; layers tilted with respect to the bounding surface planes; and in order to produce ferroelectric smectic structures with monostable, bistable, or multistable states which exhibit novel and useful electro-optic properties.

These new devices share with the device of said patent the following important advantages of the SSFLC geometry in electro-optic applications: (1) a significant component of the electric field-induced director rotation is normal to the plane of the bounding surface; (2) the response time for electric field-induced molecular reorientation is minimized, being determined by intrinsic orientational viscosity, and not by the field-induced elimination of long lived topological defects.

It should also be noted that either these or the device of said patent can employ any of the ferroelectric liquid crystal phases.

FIG. 1 illustrates the geometry relevant to our description. The smectic layers such as layer 100 are planes taken to be parallel to the x,y plane, the layer normal being $\hat{z}$. The x,y axes are oriented so that x is parallel to the line of intersection of the layers with the bounding surface. Indicated in FIG. 1 is ñ, with its sign always chosen so that $\hat{n} \cdot \hat{z} > 0$. Note that, although the director ñ is commonly written in the art as a vector, there is no physical significance attached to its sign, that is ñ and −ñ describe the same physical state, so that ñ can be represented by a line segment (said patent, FIGS. 1 and 2). Also indicated is the unit vector parallel to the projection of n̂ on the layer plane, ĉ, and the ferroelectric polarization $\vec{P}=P(\hat{z}\times\hat{n})$, which is always mutually perpendicular to both n̂ and ĉ. Two collinear directions, depending on the sign of P, are thus possible for $\vec{P}$, and examples of each kind are know in the art. If $P>0$ for a certain substance, then ẑ, n̂, and $\vec{P}$ form a right-handed coordinate system and we have a (+) substance with regard to polarization. If $P<0$, they form a left-handed system, as the one in the figure, and we have a (−) substance. The concrete examples of compounds most often cited in this and the original application, DOBAMBC and HOBACPC, both belong to the (−) class, and subsequent figures in this and said patent exemplify the situation for these compounds, regarding the spatial relationship of n̂ and $\vec{P}$. The angle between n̂ and ẑ is Ψ, and the angle between n and the normal to bounding surface 102, ŝ, is Ω. The angle δ gives the tilt of smectic layers 100 away from being normal to plates 102, i.e., δ is the angle between ẑ and the surface of bounding plate 102. The angle α is between x̂ and n̂$_s$, the projection of n̂ onto the bounding surface 102.

FIG. 2 indicates, for a (+) substance (a) and a (−) substance (b), the projection of n̂ and $\vec{P}$ on the layer (x,y) plane 104, showing also ĉ and the intersection of the layer with surface bounding plates 106 and 108. The mutually perpendicular vectors, $\vec{P}$ and ĉ, are constrained to lie parallel to the x,y (layer) plane so that any possible $\vec{P}$-ĉ reorientation can be described by the single angle φ between x̂ and ĉ. A constant electric potential difference across the bounding plates produces an electric field E, parallel to s, whose component along the y axis $y = \hat{y}E\cos\delta$ makes and angle φ with the $\vec{P}$ of a (+) substance. If, as in said patent, the layers are perpendicular to the plates ($\hat{s}=-\hat{y}$, $\delta=0$), then $\vec{E}_y=\vec{E}$, and the layer width along y is just the liquid crystal layer thickness, d. Since n̂ is not parallel to the plane of the paper, a short bar is added to the end of n̂ which is up out of the paper toward the reader.

III. BRIEF DESCRIPTION OF THE DRAWING

These and other objects and advantages of the invention will become more apparent and more readily appreciated from the following detailed description of the presently preferred exemplary embodiment of the invention taken in conjunction with the accompanying drawings, of which:

FIG. 1 is a schematic representation of a liquid crystal and associated boundary surface;

FIGS. 2a and 2b are schematic representations of chiral (+) and chiral (−), bounded liquid crystals;

FIGS. 6a and 6b are schematic representations of surface orientations adopted with POLAR boundary conditions;

FIG. 16 is a schematic, exploded representation of a transmissive electro-optical device according to the present invention;

FIG. 17 is a schematic, exploded representation of a reflective electro-optical device according to the present invention;

FIG. 19 is a schematic, exploded representation of a reflective electro-optical device with a polarizer behind the liquid crystal;

FIGS. 20a, 20c and 20d represent schematic diagrams of possible multithickness devices;

FIG. 20b is a side elevation view of the device schematically depicted in FIG. 20c;

FIGS. 21a and 21b are representations of devices having two liquid crystal layers between three aligning means having two pairs of electrodes;

FIGS. 22a and 22b are schematic representations of devices having two liquid crystal layers wherein a single electric field is applied;

FIG. 23 is a schematic representation of a device with different boundary conditions on the two surfaces;

FIGS. 24a and 24b are schematic representations of a device with different switching thresholds at the top and bottom surfaces;

FIG. 25 is a schematic representation of a device which combines the output of several pixels with optics;

FIGS. 26a and 26b are schematic representations of a device in which the electric field is applied parallel to the boundary glass plates;

FIGS. 27a, 27b and 28 are schematic representations of a device employing temperature variations to establish additional states; and FIGS. 29 and 30 are schematic representations of devices employing patterned electrode and surface treatment areas.

IV. BOUNDARY CONDITIONS

A. Introduction

Figure 3A:
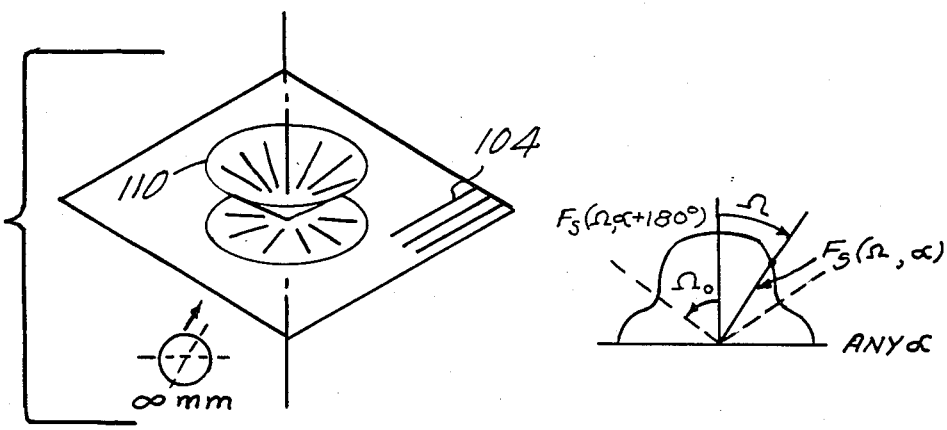
FIGS. 3a–3e are schematic representations of boundary conditions and corresponding polar diagrams of surface energy.
Figure 3B:
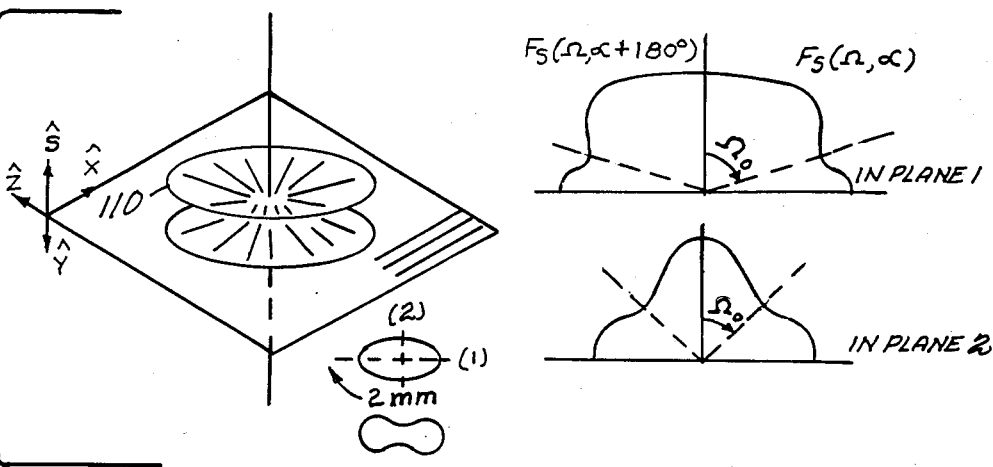
Figure 3C:
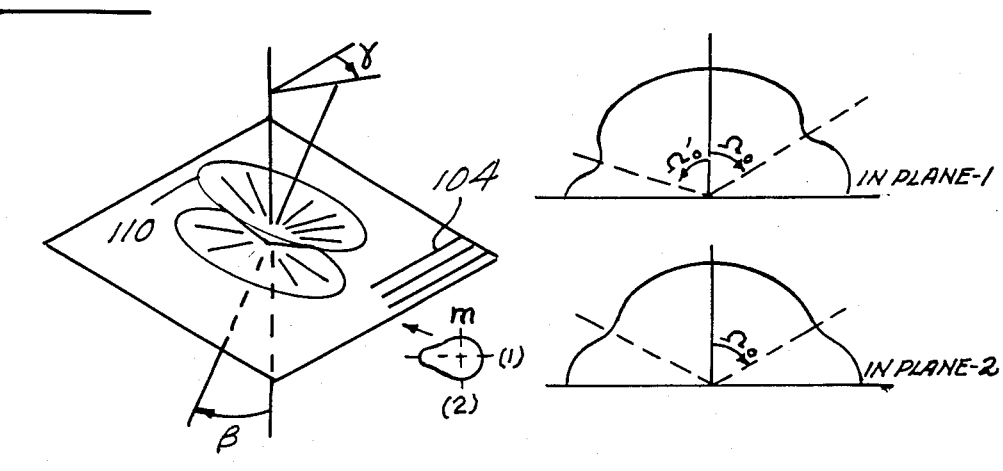
Figure 3D:
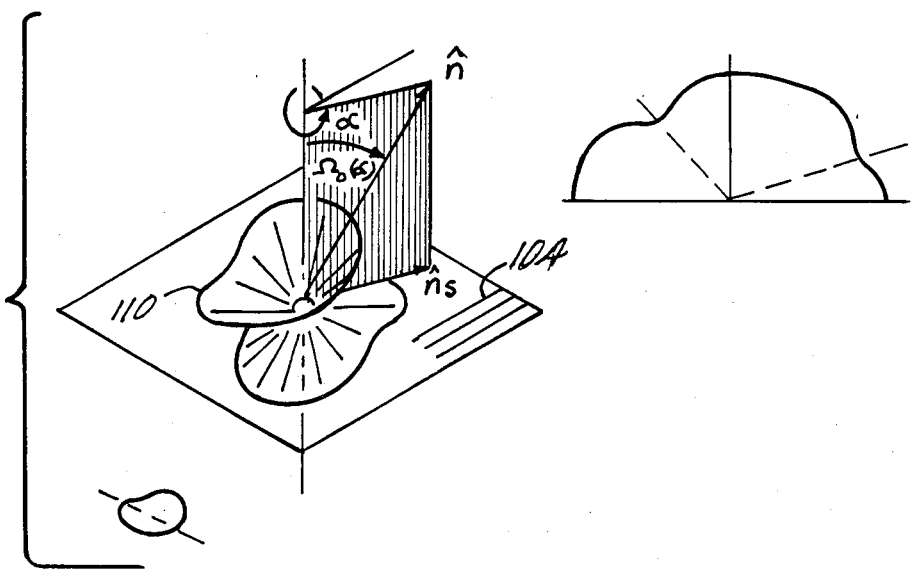

Discussed herein are molecule-surface interactions which exert torques on the molecules, and therefore on the director, in the vicinity of the surface. These interactions are said to establish some boundary condition on the director. Interactions which are known in the art to produce such torques are: (1) chemical bonding (e.g. covalent or hydrogen bonding) of liquid crystal and surface molecules or groups, which acts only on molecules in contact with the surface; (2) dipole-induced dipole interactions (anisotropic Van der Waals interactions) which will influence a layer of finite thickness at the surface; (3) electrostatic interactions, such as the electrostatic repulsion of the permanent liquid crystal molecular dipoles from a surface of dielectric constant lower than that of the liquid crystal; (4) steric interactions, i.e. a particular surface orientation may produce more efficient packing of the molecules near the surface; (5) macroscopic elastic effects, such that, for example, the director at the surface will rotate to minimize distortion of the director field.

It is common in the art to characterize the "strength" of the surface forces by measuring or calculating the surface energy per unit area, $F_s(\Omega, \alpha)$, associated with a particular orientation of the director at the surface, $\Omega$ ($0° < \Omega < 90°$) being the angle between $\hat{n}$ and the surface normal, and $\alpha$ ($0° < \alpha < 360°$) the angle between $\hat{x}$ and $\hat{n}_s$ the projection of $\hat{n}$ onto the surface plane (see FIG. 1). Surface torques are obtained by calculating appropriate derivatives of $F_s$ with respect to $\Omega$ and $\Omega$. For common liquid crystal devices both $\Omega$ and $\alpha$ are free variables, i.e. they are free to adopt whatever combination of $\Omega$ and $\alpha$ that will minimize $F_s(\Omega, \alpha)$. For the devices to be described here, however, the allowed orientations of $\hat{n}$ will be subject to the additional constraint of a preferred tilt angle, $\Psi_o$, relative to the normal to the smectic layers. Thus, it is necessary to consider the surface energetics with a constraint applied to $\hat{n}$. We will consider the variation of $F_s(\Omega, \alpha)$ vs $\Omega$ for $\alpha$ fixed, the equilibrium (preferred) angles, $\Omega_o(\alpha)$, being those for which $F_s$ is a local minimum with respect to $\Omega$, having the value $F_s(\Omega_o(\alpha),\alpha) = F_{min}(\alpha)$. For boundary conditions known in the art, $F_s(\Omega,\alpha)$ has at most one local minimum for a given $\alpha$ for $\Omega$ in the range $0° < \Omega < 90°$. FIGS. 3a–3e show polar diagrams of several possible $F_s(\Omega,\alpha)$'s, corresponding to different constraint conditions for $\hat{n}$. Here $F_s(\alpha)$ is plotted adjacent to $F_s(\alpha+180°)$ since the constraint planes for these two $\alpha$'s are identical, and $F_s(\Omega, \alpha)$ continues smoothly into $F_s(\Omega,\alpha+180°)$. For a given $\alpha$, external torques, arising from applied fields or from nonuniformity of the director field, are required to change $\Omega$ from one of its equilibrium values of $\Omega_o(\alpha)$.

B. CONICAL Boundary Conditions

The equilibrium condition for the director at a bounding plate can be represented by a boundary orientational constraint surface which is the generalized conic surface swept out by a line making the angle $\Omega_o(\alpha)$ with the surface normal as $\alpha$ is increased from 0° to 360°. Examples of possible such boundary constraint surfaces 110, corresponding to the indicated $F_s(\Omega,\alpha)$, are shown in FIGS. 3a–3e and will be discussed in the following sections. In general, there are two distinct classes of boundary conditions: COMPLETE CONICAL boundary conditions, as exemplified by FIGS. 3a–3d in which the boundary constraint surface exists in the entire range $0° > \alpha > 360°$, i.e., there is local minimum in $F_s$ for each $\alpha$, and INCOMPLETE CONICAL boundary conditions, as exemplified by FIG. 3e, in which the boundary constraint surface exists for only part of the $\alpha$ range. These cases will now be discussed in turn:

1. COMPLETE CONICAL Boundary Conditions (a) CIRCULAR CONICAL Boundary Conditions (FIG. 3a)—A particularly simple case of CONICAL boundary conditions are CIRCULAR CONICAL boundary conditions, for which, in the absence of external torques, the director can take any orientation on a cone of angle $\Omega_o$, coaxial with the surface normal. Special cases of CIRCULAR CONICAL boundary conditions are the usual homeotropic boundary conditions for which $\Omega_o = 0°$ (director normal to the surface), and the boundary conditions of said patent, $\Omega_o = 90°$. The general CIRCULAR CONICAL boundary condition is known in the art (for example, see G. Ryschenkov and M. Kleman, *Journal of Chemical Physics*, Volume 64, pp. 404–412, 1976, and E. Dubois-Violette and P. G. de-Gennes, *Le Journal de Physique*, Volume 36, pp. L255–258, 1975).

The simplest expression for $F_s$ yielding CIRCULAR CONICAL boundary conditions is $F_s = 4\Gamma[1 - \{(\sin\Omega\sin\Omega_o)^2 + (\cos\Omega\cos\Omega_o)^2\}]$, which is minimum for $\Omega = \Omega_o$ and which has four maxima as $\Omega$ varies from 0° to 360°. For the case of the device of said patent ($\Omega_o = 90°$), $F_s$ reduces to $F_s = 4\Gamma(\cos\Omega)^2$. The strength of the surface interaction depends on the magnitude of the surface energy anisotropy parameter, $\Gamma$. The larger $\Gamma$ is, the larger will be the surface torques constraining $\Omega$ to be $\Omega_o$, all else being equal.

CIRCULAR CONICAL boundary conditions with $\Omega_o = 90°$ can be created by using clean glass to contain the liquid crystal. $\Omega_o$ can be varied by adding a thin hydrocarbon layer on the glass. As the thickness of the hydrocarbon layer varies, $\Omega_o$ will vary.

(b) ANISOTROPIC CONICAL Boundary Conditions (FIGS. 3b–d)—It is also possible to make CONICAL boundary conditions which are anisotropic in the bounding surface plane, by introducing anisotropy into surface treatments which would otherwise produce CIRCULAR CONICAL boundary conditions. Such ANISOTROPIC CONICAL boundary conditions may be classified according to the point group symmetry of their boundary constraint surface. For example, a weak bidirectional rubbing of the surface to establish a special surface direction before deposition of the thin hydrocarbon layer according to Ryschenkov (op. cit.) would produce a surface state characterized by the point group symmetry 2 mm, which could be simply represented by the elliptical cone of FIG. 3b. Alternatively, the thin hydrocarbon layer could be applied with molecules oriented in a predetermined manner. One of the two mirror planes would be parallel to, and the other perpendicular to, the special direction. In a similar way, unidirectional rubbing or oblique evaporation of material onto the surface would lead to a surface state characterized by the point group symmetry m, for instance exemplified by the oblique circular cone in FIG. 3c, the axis of which is rotated away from the surface normal by the polar angle $\beta$ in the direction given by the azimuthal angle, $\alpha$. In the general case, as exemplified by the boundary constraint surface in FIG. 3d, the surface state will not be symmetric under any point operations.

Different symmetries are possible with the liquid crystal applied "epitaxially" on a clean crystal solid surface. Thus, if the crystal solid surface is hexagonally arranged, "grooves" in three directions are created, thus creating threefold symmetries with the liquid crystal.

2. INCOMPLETE CONICAL Boundary Conditions

For some surface treatments there will be a local minimum of $F_s(\Omega, \alpha)$ vs $\Omega$ for only a finite range of $\alpha$. An example of such a boundary constraint surface is indicated in FIG. 3e. This boundary constraint surface, which could be obtained by slightly oblique evaporation of SiO, has the favored director tilt at the surface of $\Omega_o(0)$ for the evaporation direction plane ($\alpha=0$). The angle $\alpha=0$ is the angle of minimum $F_s(\alpha)$, so that the otherwise unconstrained director would adopt the orientation $\Omega_o(0)$, $\alpha=0$ at the surface. In the smectic C, satisfying the layer constraint cone can force $\alpha$ to be nonzero with the result of changing $\Omega_o(\alpha)$, up to some maximum $\alpha=\alpha_m$, at which the local minimum in $F_s$ disappears. An attempt to increase $\alpha$ beyond this value would result in the director effectively flipping 180° in $\alpha$, to $\alpha+180°$, which is again less than $\alpha_m$.

C. POLAR Boundary Conditions

The liquid crystal-surface interaction can possess components which favor POLAR boundary conditions in addition to components favoring CONICAL. Considered here are interactions between the surface and the ferroelectric polarization, which orient the molecules at the surface to favor a particular orientation of the component of P normal to the surface, i.e. either into or out of the surface. To cite an example of such an interaction, a surface covered with discrete dipoles directed away from the surface would tend to align P at the surface in the same direction.

The present inventors have discovered cases where the ferroelectric liquid crystal favors an orientation either into or out of the surface for the component of the ferroelectric polarization vector normal to the surface. That is, the interaction of a particular surface treatment with a particular compound may prefer the ferroelectric polarization vector at the surface to be directed out of the liquid crystal region and into the surface material region. For example, it has been found that the ferroelectric smectic C liquid crystals, S-4-(6-methyl)octylresorcylidene-4'-octylaniline, or bis (S,S-4'-(6-methyl)-octyloxybenzylidene)-2-chloro-1,4-phenylenediamine, when in contact with a clean indium tin oxide coated glass surface, adopts this kind of a polar orientation of the ferroelectric polarization near the interface. Alternatively, molecules with large dipole moments may be chemically attached to glass plates. Similarly, glass plates may be diode in acid or base to create dipoles at the surface of the glass. Finally, a liquid may be doped with a highly polarized molecule which can adsorb onto glass plates. The direction of polarization depends on the kind of glass and liquid used.

D. Boundary Surfaces With Multiple Physical States

When the liquid crystal is applied "epitaxially" on a clean crystallographic solid surface, molecule-crystal interactions can produce specific director orientation at the surface. Moreover, the boundary can be active in the sense that the surface condition may itself be switchable, for instance when the crystal surface belongs to a solid having a switchable structural transition, such as a crystalline ferroelectric. Changing the state of the solid switchable surface will generally give rise to an increased number of optically distinct states for the cell as a whole. Thus, it is well-known from studies of MBBA on Triglycine Sulphate (M. Glogarova, *Le Journal de Physique*, Volume 42, pp. 1569-1574, 1981), that the nematic director of the MBBA orients along the surface if applied on a cleavage plane of TGS, but with an appreciable angular difference (32°) if adjacent to a (+) or a (−) domain, respectively. The possibility of favoring one or the other director orientation in the corresponding ferroelectric smectic case adds a new interesting means of active addressing.

In addition, crystalline ferroelectric boundaries will produce electric fields in the bulk liquid crystal which will also act to orient the molecules (M. Glogarova, ibid.). This is especially useful in the ferroelectric smectic case as the field interaction with the liquid crystal polarization can be expected to be more powerful than in nematics. This combination of liquid crystal and solid ferroelectric would combine the solid's strong polarization and stability with the fluidity and large optical response of the liquid crystal.

V. NORMAL LAYER GEOMETRY

A. CIRCULAR CONICAL Boundary Conditions

Figure 3E:
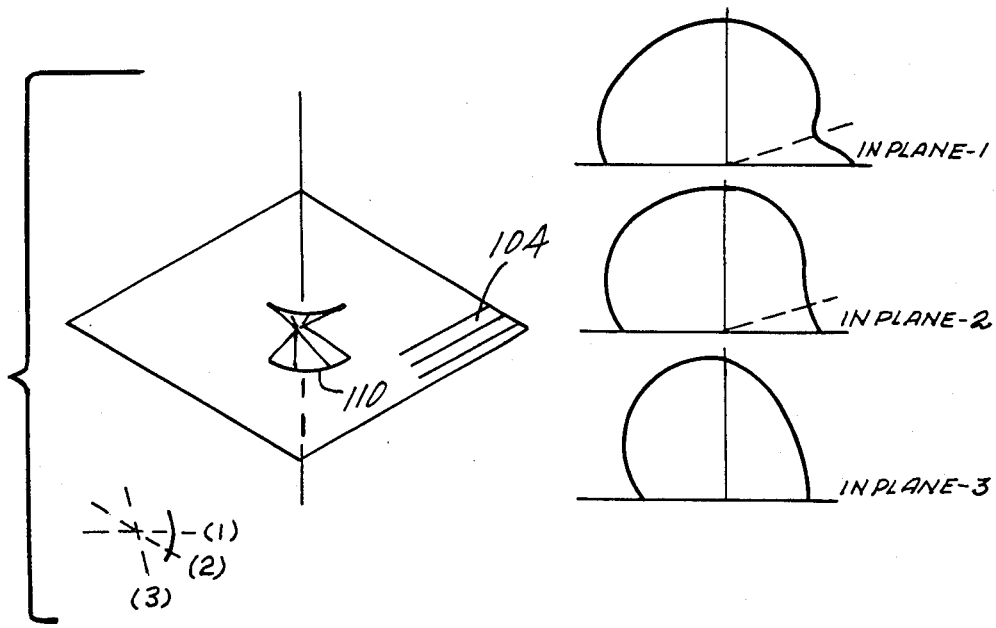

When the CIRCULAR CONICAL boundary condition is applied to the surface stabilized ferroelectric liquid crystal geometry, the director near the surface is under two constraints: it must lie on the surface circular cone of angle $\Omega_o$, the axis of which is normal to the surface, as in FIG. 3a; it must also lie on the layer cone of angle $\Psi_o$, the axis of which is normal to the layers. Surface cone of constraint 110, and layer cone of constraint 112 of liquid crystal 114 are indicated in FIG. 4a for the case where smectic layers 104 are normal to bounding surface planes 116 and 118. Simultaneous application of these two constraints in general determines four allowed values of $\phi$ at each surface, i.e. four physically distinct allowed orientations of the director, 1, 2, 3, and 4 shown in FIG. 4a, and in FIG. 4b(i), which indicates as a circle layer constraint cone 112 with its axis normal to the plane of the paper, the dots giving the intersections with the surface constraint cone (top), and showing the four orientations of $\vec{n}$ along with their associated polarization vectors, $\vec{P}$, projected onto a plane parallel to the smectic layers (bottom). As mentioned above, $\vec{n}$ is indicated as being not parallel to the plane of the projection surface by adding a short bar to the end of $\vec{n}$ which is up out of the surface. The dashed arrows indicate the stable states of $\vec{P}$ at a given surface. Thus, between each dashed arrow orientation is a surface energy maximum.

Some particular examples will now be discussed in reference to FIG. 4b of the behavior at a single surface 116 arising from CIRCULAR CONICAL boundary conditions and discussed later, in Section IX, combinations of similar and different boundary conditions on the two surfaces. At a single surface, phenomena to be observed can be divided into two classes, depending on whether $\Omega_o$ is smaller or larger than $90° - \Psi_o$ (see FIG. 4a). We discuss these cases in turn:

$$90° - \Psi_o < \Omega_o < 90° \qquad \text{(i)}$$

Figure 4B:
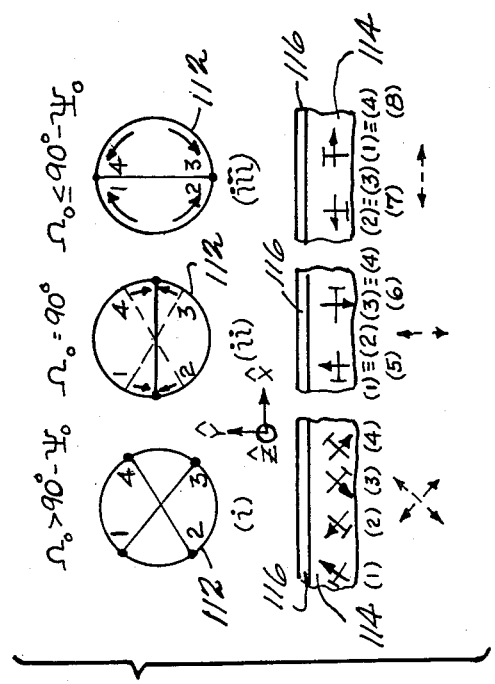
FIGS. 4a and 4b are schematic representations of the effect on liquid crystal material of circular conical boundary conditions.
Figure 4A:
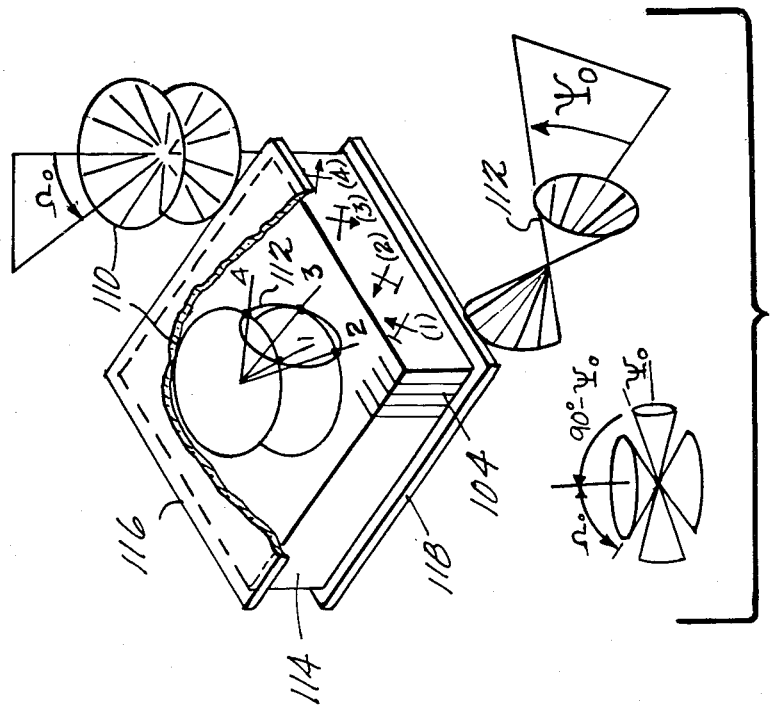

In this, the general case, cones 110 and 112 intersect and yield four stable surface orientations as indicated in FIGS. 4a and 4b(i). These states may be grouped according to whether $\vec{P}$ is directed toward (1 and 2) or away from (3 and 4) the surface, or according to whether $\vec{P}_x$, the horizontal component of $\vec{P}$, is directed left (2 and 3) or right (1 and 4).

$$\Omega_o = 90° \qquad \text{(ii)}$$

As $\Omega_o$ increases toward 90°, the allowed orientations rotate so as to make $\vec{P}$ more normal to the bounding surface, so that, for example, the orientations of states 1 and 2 become more alike. At $\Omega_o = 90°$ surface cone 110 collapses to a plane, the intersections 1 and 2 overlap so that states 1 and 2 become identical (1≡2), with $\vec{P}$ normal to the surface. Thus, the four initial states reduce to two, $1 \equiv 2$ and $3 \equiv 4$, indicated in FIG. 4b(ii) and respectively numbered 5 and 6. These are the boundary conditions and states described in said patent.

$$\Omega_o \leq 90° - \Psi_o \quad \text{(iii)}$$

As $\Omega_o$ decreaes, $\vec{P}$ in the various states rotates further away from being normal to the surface, so that states 2 and 3 become more similar, as do states 1 and 4. For $\Omega_o = 90° - \Psi_o$ cones 110 and 112 touch along just two lines of intersection, one coincident with the intersections giving states 2 and 3, the other with the intersections giving states 1 and 4. That is, states 2 and 3 are identical ($2 \equiv 3$), with the orientation $\phi = 270°$, and 1 and 4 become identical with the orientation $\phi = 90°$, $\phi$ again being the angle between $\hat{x}$ and $\hat{c}$. Note that these states, respectively numbered 7 and 8 and shown in FIG. 4b(iii), have the ferroelectric polarization parallel to the surface.

If $\Omega_o < 90° - \Psi_o$ cones 110 and 112 do not intersect so that the boundary and layer constraint cannot be simultaneously satisfied. As a result, the weaker of the constraints will be violated, the system response depending on the strength of the bulk forces maintaining $\Psi = \Psi_o$ relative to the surface forces maintaining $\Omega = \Omega_o$. Observations indicate that in general the forces maintaining the smectic C tilt angle are dominant, so that the smectic C tilt angle everywhere remains close to $\Psi_o$. If this is so, then the surface forces will rotate $\hat{n}$ in order to make $\Omega$ as close to $\Omega_o$ as possible. The two orientations indicated in FIG. 4b (iii), obtained for $\Omega_o = 90° - \Psi_o (\phi = 90°$ and $\phi = 270°$) satisfy this condition as well. Under conditions where the surface forces dominate, these same two angles will be stabilized, with the director tilt angle increasing from $\Psi_o$ to $\Omega_o$ as the surface is approached.

B. ANISOTROPIC CONICAL Boundary Conditions

A key symmetry property governing the combination of surface stabilized states obtained and their electrical switchability (to be discussed in Section IX) is the symmetry behavior of the boundary constraint surface under the mirror reflection $x \rightarrow -x$. The behavior under this operation will not only depend on the shape of the boundary constraint surface but also on the orientation of its point group symmetry directions relative to the layer direction. Surfaces having ANISOTROPIC CONICAL boundary conditions will, for purposes of this discussion, be divided into two classes, those symmetric under the operation $x \rightarrow -x$ [SYMMETRIC ANISOTROPIC CONICAL (S)], and those not symmetric under this operation [UNSYMMETRIC ANISOTROPIC CONICAL (U)]. For example, the elliptical cone of FIG. 3b will give boundary conditions (S) only if the mirror planes are parallel or perpendicular to the x direction. As a further example, tilting the circular cone 110 as in FIG. 3c away from the surface normal in the direction parallel to the smectic layers ($\gamma = 0$), yields boundary conditions -U-, in particular the set of states shown in FIG. 5. Note that these states are obtained respectively from those of FIGS. 4b(i) to (iii) by rotating all of the states in the same direction through the angle $\beta$. This rotation eliminates the reflection symmetry about the y,z plane ($x \rightarrow -x$) present in the states of FIG. 4b. For the general case of UNSYMMETRIC ANISOTROPIC CONICAL boundary conditions, the allowed states will not be obtainable by such a simple rotation of a CIRCULAR CONICAL boundary constraint surface. Section IX explains that -U- boundary conditions are required for electric field-induced switching between states of opposite $\vec{P}_x$.

For ANISOTROPIC CONICAL boundary conditions, the surface energy, $F_{min}(\alpha)$, may be different for the various director orientations satisfying the constraints. In this case one or several of the allowed orientations may be favored over the others.

C. INCOMPLETE CONICAL Boundary Conditions

The intersection of such an INCOMPLETE boundary constraint surface with the layer constraint cone leads to many of the same geometrical features as discussed for the COMPLETE case in the previous section, with one notable addition. Consider the intersection with the layer cone 112 of the boundary constraint surface 110 of FIG. 3e having $\Omega_o \simeq = 90°$ and its symmetry axis at an angle $\Psi_o$ from $\hat{z}$. In this case, only the 5 surface state will satisfy the two constraints, making it energetically favored over the 6 surface state, FIG. 4b and related discussion for surface state definitions which, in this case is absolutely unstable (no energy minimum), and making the surface intrinsically monostable. Thus, by oblique SiO evaporation it is possible to favor either the 5 or 6 state.

D. POLAR Boundary Conditions

The following situations produce POLAR orientation: (i) direct coupling to $\vec{P}$ - for example, a surface covered with discrete dipoles directed away from the surface would tend to align $\vec{P}$ at the surface in the same direction, as discussed in Section IV C; (ii) variation of $F_{min}(\alpha)$ with $\alpha$ - with ANISOTROPIC CONICAL boundary conditions, discussed in Sections IV A and V B; (iii) absolutely monostable surfaces - obtained with INCOMPLETE boundary conditions, discussed in Sections IV B and V C.

FIGS. 6a and 6b indicate the surface orientations adopted with POLAR boundary conditions favoring the orientation of $\vec{P}$ out of and into, respectively, the liquid crystal layer. As with the case of CONICAL boundary conditions, externally applied torques may force the surface orientation away from this equilibrium condition.

The liquid crystal-surface interaction will, in general, possess components which favor POLAR boundary conditions in addition to components favoring CONICAL. The resulting behavior at the surface will depend on the relative strengths of the two kinds of interaction. For example, if there are only interactions favoring CIRCULAR CONICAL boundary conditions, then the four surface states of FIG. 4b(i) will be possible as to be discussed in Section V. If a weak POLAR surface interaction favoring the orientation of the polarization, $\vec{P}$, into the surface is now added the result will be an enhancement of the stability of the two states of FIG. 4b having $\vec{P}$ directed toward the surface (1 and 2) over the other two. Hence, the addition of the polar interaction will reduce the number of stable states from four to two, although for weak POLAR interactions the two higher energy states will be metastable. In the two remaining stable, states the angle $\Omega$ will be smaller than $\Omega_o$, as the POLAR interaction will tend to rotate P toward the surface. As the POLAR interaction is further increased in strength, $\vec{P}$ will rotate closer to being normal to the surface until, at a sufficiently large value of the POLAR interaction strength, the polarization will discontinuously rotate to be normal to the surface, taking up the orientation of FIG. 6b. In this case, the distinction between states 1 and 2 is lost, and the number of stable surface states is reduced to one, $1 \equiv 2$.

VI. TILTED LAYER GEOMETRY

In the device of said patent the smectic layers were arranged to be perpendicular to the bounding plates (said patent, FIG. 2). The more general situation will now be discussed wherein the bounding plates make some angle $\delta$ with the normal to the layers. In the configuration of FIG. 1, bounding surface 102 contains the $\hat{x}$ axis and is rotated about the $\hat{x}$ axis by the angle $\delta$ from the $\hat{x}$ axis. The condition $\delta=0$ applies to the device of said patent and to discussion of CONICAL and POLAR boundary conditions up to this point. It is possible to prepare ferroelectric smectic C layer structures between plane parallel plates in which the layers are not normal to the plates. In some cases, the surface energy will be significantly lowered by having $\delta \neq 0$, in which case the layers will tend to spontaneously tilt from being normal to the surface. If this dependence of surface energy on $\delta$ is sufficiently weak, then tilted layers can be achieved in several other ways: by displacing, in the smectic C phase or in the lower temperature range of the smectic A phase, one bounding plate relative to the other in the direction normal to the layers; by cooling the liquid crystal into the smectic C phase in the presence of a strong magnetic field; by shear or applied fields combined with appropriate boundary conditions. As an example of the latter, as discussed in Section IV, by slightly oblique evaporation of a material like silicon monoxide onto a clean surface, an "INCOMPLETE CONICAL" surface orientation results, having, in the simplest case of $\Omega_o=90°$, the director at the surface parallel to the surface and in a particular orientation. This can lead to a cell having two distinct regions, each with flat smectic C layers, one with the layers inclined to the surface normal through an angle $\delta$ equal to the director tilt angle $\Psi_o$, and the other with $\delta=-\Psi_o$. A further applied field, shear, or surface treatment can then favor one kind of domain over the other, producing a single orientation. This will be discussed further in Section X E.

The major factor governing the layer structure and orientation is the fact that, in a smectic, the layers are difficult to compress. Thus, for stresses usually encountered, taking the layer spacing to be a constant is a very good approximation. As a result, the layer inclination angle, $\delta$, once established, will change little from one area of the sample to another. In a sample having nearly flat layers, the angle $\delta$ will be determined by surface interactions, or if these are weak, by occasional focal conics or edge dislocations, smectic defects introduced during the process of formation of the layers in either the smectic C or A phase, the structure of which is known in the art to establish smectic layer orientation in adjacent volumes. See, for example, M. Kleman, *Points. Lignes. Parois*, Les Editions de Physique, Orsay, 1978, pp. 165–171, and C. E. Wiliams and M. Kleman, *Le Journal de Physique*, Volume 35, pp. L33–37, 1974.

Ferroelectric smectic C structures with tilted layers, when employed with the boundary conditions discussed above in Section IV, offer additional advantages in obtaining novel and useful electro-optic effects. First to be considered is what happens at single surfaces having CIRCULAR CONICAL and/or POLAR boundary conditions with a ferroelectric smectic C liquid crystal with tilted layers, i.e., $\delta$ nonzero.

Figure 7B:
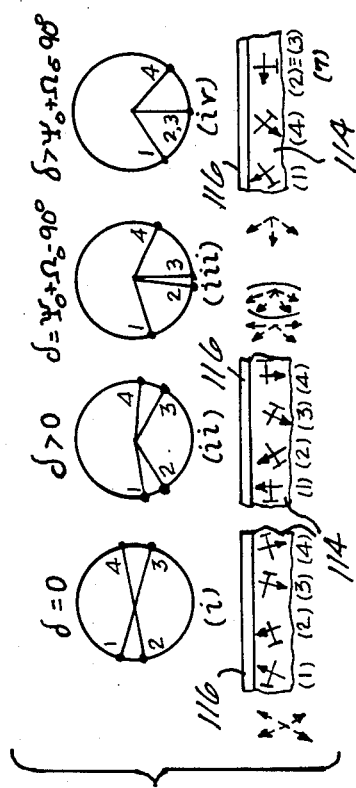
FIGS. 7a–7d are schematic representations of the effect on liquid crystal material with layers tilted from the normal to the boundaries.
Figure 7C:
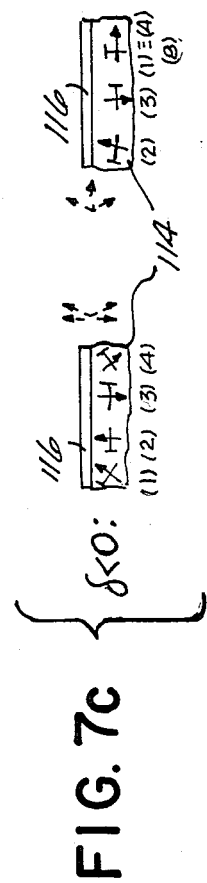
Figure 7D:
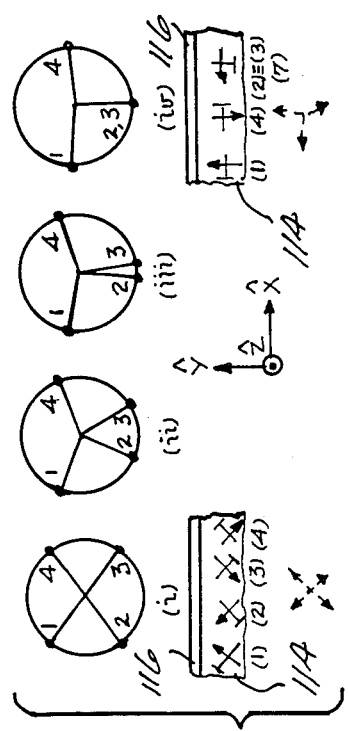
Figure 7A:
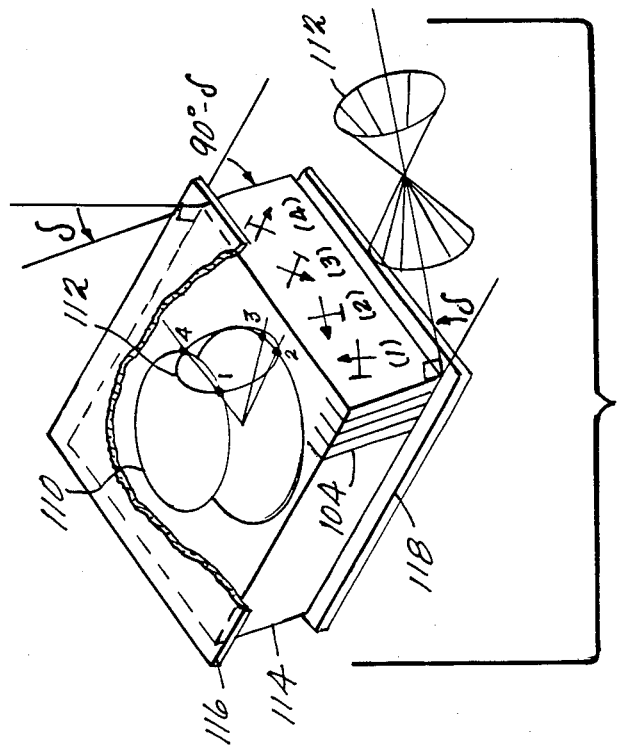

In the general case of CIRCULAR CONICAL boundary conditions and tilted layers, the surface orientations are determined by the intersection of two cones of constraint 110 and 112 similar to that already discussed in FIG. 4a for $\delta=0$. If $\delta$ is increased from zero so as to tilt the lower part of the layers up out of the plane of the paper toward the reader, then layer constraint cone 112 will rotate as indicated in FIG. 7a. As a result, the intersection orientations will rotate as shown there and in FIG. 7b, which indicates layer constraint cone 112 with its axis normal to the plane of the paper as a circle and indicates the intersections with surface constraint cone 110 as dots. The sequences (i) to (iv) in FIGS. 7b through 7d give two possible examples of the motion of the intersections as $\delta$ is increased from 0. The corresponding motion of the $\vec{P}$–n cross indicated below each step shows the polarization, $\vec{P}$, of states 1 and 4 rotating so as to become more normal to the surface, $\vec{P}$ of states 2 and 3 rotating to become more parallel to the surface. Note also that in the two states having P directed toward the top and bottom surfaces, the rotation is counterclockwise and clockwise, respectively. This situation will exist with $\delta$ in the range $\Psi_o-\delta>90°>\Omega_o$. For $\delta=\Psi_o+\Omega_o-90°$ the intersections giving states 2 and 3 merge so that states 2 and 3 become identical, with $\vec{P}$ to the surface. For $\delta>\Psi_o+\Omega_o-90°$ states 1 and 4 rotate further and states 2 and 3 remain at 270°, according to the discussion of Section V A(iii). The result is a surface orientation having three stable states, 1, 4, and 7. If the layer tilt is of the opposite sign so as to tilt the lower part of the layers away from the reader, then the rotations occur with opposite sign producing the states of FIG. 7c and, for $\delta$ sufficiently large, the three states 2, 3, and 8. The orientation of states 1 and 4 for $\delta>0$ (FIGS. 7b and 7d) depends on $\Psi_o$, $\Omega_o$, and $\delta$. For $\Psi_o$ and $\Omega_o$ large ($\Psi_o \approx 45°$ and $\Omega_o>70°$, FIG. 7b) the orientations of states 1 and 4 will pass through $100=180°$ and $\phi-0°$, respectively (FIG. 7b, (i) to (iv)) producing the states 1, 4 and 7 of FIG. 7b(iv) for sufficiently large $\delta$. Note that in FIG. 7d(iv) states 1 and 4 differ from 7 in sign of $P_x$, whereas in FIG. 7b(iv) $\vec{P}_x$ has the same sign in all three states.

VII. INTRINSIC SPLAY OF THE POLARIZATION FIELD

Figure 8A:
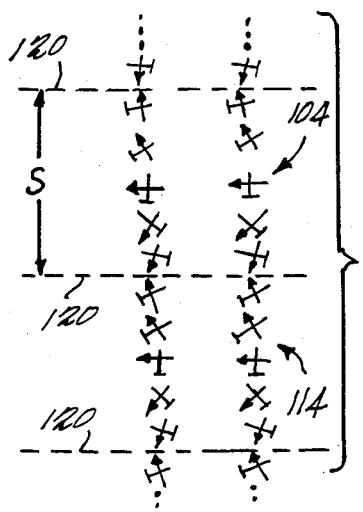
FIG. 8a is a schematic representation of intrinsic polarization splay in a liquid crystal.
Figure 8B:
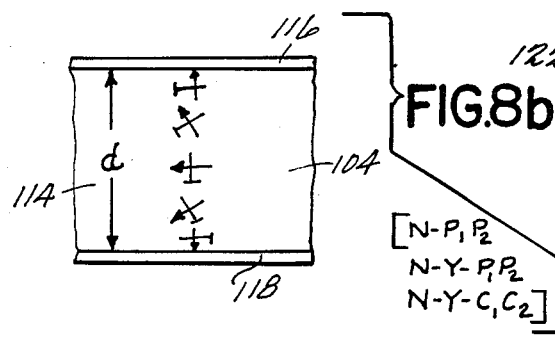
FIG. 8b is a schematic representation of a device in which the liquid crystal polarization field is splayed.

In a bulk ferroelectric smectic there is a spontaneous helical distortion of the director and polarization fields in which the azimuthal orientation, $\phi$, increases linearly as a function of distance normal to the layers (said patent, FIG. 1). This helical twisting of the polarization field occurs because of a local spontaneous twist and bend distortion of the director field resulting, in turn, from the interaction of the chirally asymmetric molecules, as discussed by Meyer in *Molecular Crystal and Liquid Crystals*, Volume 40, pp. 33–48, 1977. Another possible response of $\phi$ to this spontaneous twist-bend tendency is the linear variation of $\phi$ as a function of distance parallel to the layers leading to a splay deformation of the polarization field, rather than the twist variation characteristic of the bulk. This distortion is illustrated in FIG. 8a, representing again a cut along a layer plane. It is not observed in bulk ferroelectric liquid crystals because, in order to fill space with having such a distortion, it is necessary to introduce defects (disclinations) in the orientation field at which $\phi$ changes abruptly by up to 180°, as indicated by dashed lines 120 in FIG. 8a. The spacing, S, between defects 120 will be governed by the strength of the local director twist and bend distortions. Such defects are costly in energy so that the helix, which by virtue of its geometry is defect free, is the lower energy state in the bulk. In samples of finite thickness such as we are discussing here, however, such defects can occur at the surfaces and the spontaneous splay of P may, in fact, lower the energy of a particular configuration of $\phi$. For example, consider the situation of FIG. 8b, which shows a ferroelectric smectic 114 between identical, POLAR surfaces 116 and 118 which act to direct P out of the sample. The result is change in $\phi$ of $\simeq 180°$ from one side of the sample to the other. If the ferroelectric liquid crystal has a spontaneous splay of P such that the defect spacing, S, is close to the sample thickness, d, then this 180° rotation will naturally occur and the spontaneous splay will tend to stabilize the configuration indicated in FIG. 8b.

As in the case of the bulk ferroelectric helix, the tendency to form a spontaneous polarization splay can be strong (leading to a small S) or weak (leading to a large S) and may be adjusted independently of P, the magnitude of $\vec{P}$. For example, a mixture of two materials with the same sign of P but opposite signs of spontaneous splay can have P comparable to the pure materials, but have a much weaker spontaneous splay of $\vec{P}$. Whether the spontaneous splay of $\vec{P}$ is of consequence in a given device structure will depend on the size of S relative to the sample thickness, d. If S $>>$ d, then the spontaneous splay should be of little importance. If S $\leq$ d, then variations of $\phi$ having the spontaneous splay of P will be favored.

VIII. COMBINED FERROELECTRIC AND DIELECTRIC TORQUES IN LIQUID CRYSTAL DEVICES

One of the important features of ferroelectricity in liquid crystals, first pointed out by Meyer et al. (op. cit.), is that the bulk ferroelectric dipole moment density (P) leads to an electric field (E) induced director torque density, $T_f(\phi) = -PE\sin\phi$ for the electric field direction indicated in FIG. 2, which is linear in E and rotates the director to $\phi=0°$ for P and E positive. Because the liquid crystal will also generally possess some dielectric anisotropy, $\Delta\epsilon$, the director will also experience a dielectric torque, $T_d = -\Delta\epsilon E^2\sin 2\phi$, well-known in the art to produce molecular reorientation as, for example, in twisted nematic devices. For positive $\Delta\epsilon$ the torque $T_d$ orients the director to either $\phi=90°$ or 270°. It is possible to make ferroelectric liquid crystal structures where the presence of both torques leads to novel electro-optic effects.

For E small $T_f$ dominates since it is linear in E and $T_d$ varies as $E^2$. The two torques can be comparable for a "crossover field", $E_{f-d} \approx P/\Delta\epsilon$. For $E > P/\Delta\epsilon$, the dielectric torques dominate. For $\Delta\epsilon$ positive, reorientation from $\phi=0°$ to $\phi=90°$ or 270° can be achieved by increasing the field. This reorientation will occur as a Freederikz-like transition, i.e. there will be no reorientation until the threshold field, $E_{th}$, given by the equation, $\Delta\epsilon(E_{th})^2 - PE_{th} = K(\pi/d)^2$, is reached, beyond which $\phi$ will change continuously from 0°. For typical materials, like DOBAMBC and HOBACPC discussed in the original application, $E_{f-d} \approx 10^5$ Volts/cm. In Section IX G examples of devices employing both ferroelectric and dielectric torques will be presented.

IX. DEVICE STRUCTURES AND DEVICE STATES

A. Introduction

This application deals with Surface Stabilized Ferroelectric Liquid Crystal device structures of the type described in said patent and depicted therein in FIG. 1, having a ferroelectric liquid crystal between the plates of an optically transparent parallel plate capacitor in which an electric field can be applied normal to the plates. Using the generalized boundary conditions, layer tilt, and intrinsic polarization splay described above in various combinations, makes possible a wide variety of configurations of the orientation field, $\phi$, and associated novel electro-optic effects. The devices to be described all have the important feature in common with the basic device of said patent, that: (1) the layers are planar and normal to a specified direction over the entire sample; and (2) the liquid crystal layer is sufficiently thin that surface interactions stably unwind the intrinsic helix. These conditions result in a basic advantage in electrooptic applications, namely that the response time for electric field-induced molecular reorientation is minimized, being determined by intrinsic orientational viscosity, and not by the field-induced elimination of long-lined topological defects. We describe devices having single and multiple (up to 16) electrically accessible stable states. It is possible to surface-stabilize up to 4 states at each surface, hence a total of $4 \times 4 = 16$ device states is intrinsically possible in the general case.

Employing these generalized surface, intrinsic splay, and layer tilt conditions will clearly lead to many possible device structures with rather diverse molecular orientation states and switching properties. As a result, it has been necessary to develop a classification scheme about which the discussion of these properties will be organized. A device in a given orientational state will be named according to its DEVICE STRUCTURE and particular overall orientational DEVICE STATE as follows:

DEVICE STRUCTURE:DEVICE STATE

The DEVICE STRUCTURES are classified according to whether the layers are normal (N) or tilted (T) and as to the nature of the surface conditions employed: CIRCULAR CONICAL (C), SYMMETRIC ANISOTROPIC CONICAL (S), UNSYMMETRIC ANISOTROPIC CONICAL (U), and/or POLAR (P). If the spontaneous splay of P is important for the working of the device, the designation (Y) will be added. Each DEVICE STRUCTURE is assigned an alphanumeric code as follows:

| (T or N)-(Y, if applicable)- | top surface-boundary condition | bottom surface-boundary condition |
|---|---|---|
| | C,S,U and/or P | C,S,U and/or P |

For CIRCULAR CONICAL boundary conditions a numerical superscript will indicate the cone angle $\Omega_o$, if it is to be specified, e.g. $C^{90}$ implies $\Omega_o = 90°$. A STRUCTURE having identical boundary conditions on the two surfaces will be indicated by a single boundary condition specification "squared", for example, the boundary condition of the device in said patent is $(C^{90})^2$. If a STRUCTURE has boundary conditions of the same class but with different parameters on the two surfaces, this will be indicated by different subscripts, e.g. $C_1C_2$.

The terms "top", "bottom", "UP", and "DOWN" are employed merely as descriptive, the actual direction of the gravitational acceleration being of no relevance to the operation of these devices. As an example of this classification scheme the DEVICE STRUCTURE of said patent is:

$$N-(C^{90})^2.$$

Figure 5:
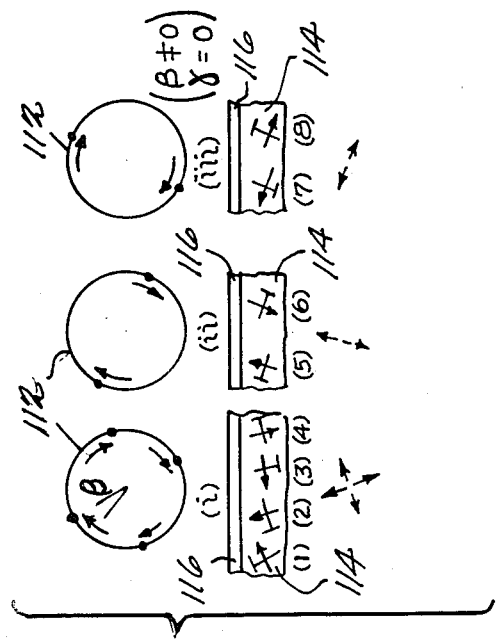
FIG. 5 is a schematic representation of the effect on liquid crystal material of tilted circular boundary conditions.

A given DEVICE STRUCTURE can have many possible overall orientational DEVICE STATES since there are a variety of stable STATES possible at each surface. Many of these DEVICE STATES can be characterized by giving the single states (numbers 1 to 8 of FIGS. 4b and 5) at the two surfaces. These numbers designate either the single surface states obtained with CIRCULAR CONICAL boundary conditions (FIG. 4b) or the single surface states which evolve from those of FIG. 4b when surface conditions become unsymmetric (FIG. 5) or the layers are tilted (FIGS. 7b, 7c and 7d). Our convention will be to express the overall DEVICE STATE by a colon followed by the top surface state and then by the bottom surface state. Although the numerical single surface state designation 1 to 8 of FIGS. 4b and 5 are defined relative to the top surface (and the $\hat{x},\hat{y},\hat{z}$ system), they will also be applied to the bottom surface in the way that states having the same orientations in space at the top and bottom surfaces have the same designations. With this convention DEVICE STATES having repeated single surface states, i.e. :55, will have the same or nearly the same orientation of the director in space at both surfaces (like corresponding orientations in FIG. 4b and c). Using this notation, the two allowed DEVICE STATES of the DEVICE STRUCTURE in said patent are:

$$N-(C^{90})^2{:}55 \text{ and } N-(C^{90})^2{:}66.$$

Thus, the DEVICE STRUCTURE, $N-(C^{90})^2$, has two DEVICE STATES, :55 and :66.

In the next sections, examples of DEVICE STRUCTURES and DEVICE STATES will be discussed, considering, for a particular DEVICE STRUCTURE, electric field-induced transitions between different DEVICE STATES and field-induced modification of DEVICE STATES. To facilitate this discussion, we establish the convention indicated in FIG. 9a for electric field direction, an UP (+) field being directed toward the TOP plate and vice versa.

With the exception of the $N-(C^{90})^2$:55 STATE having $\phi=180°$ everywhere, the application of an UP field to a DEVICE STATE will change the spatial distribution of $\phi$ (x,y,z) between the plates from that determined solely by the boundary conditions and bulk elasticity, generally rotating $\vec{P}$ into the direction of $\vec{E}$. This field-induced reorientation will, in general, alter both the surface orientations and the torque per unit area exerted by the liquid crystal on the surfaces. At lo fields, the response will be a continuous rotation of the director from its field-free value. As the electric field is increased, however, the overall bulk plus surface energy, U, may be reduced by the change of surface state, with a rotation of $\vec{P}$ toward $\vec{E}$ reducing electrostatic energy and director elastic distortion energy, with either a decrease or increase of surface energy. Such a process may be continuous or discontinuous, in the latter case occurring by the motion of discrete domain boundaries which separate the two states. Stated another way, once the field is applied, a given surface-stabilized state represents one of several local minima in U vs $\phi_t$ and $\phi_b$, the orientation at the top and bottom surfaces respectively. These minima are separated by maxima, which can be considered to limit the orientation range of a given surface state. The system will, in general, adopt the state having the lowest minimum in U. Changes of state can thus occur in the two following ways. As the field increases, one state may decrease in energy at a faster rate than others, becoming, at some critical field, the lowest energy state. In this case, the surface state change would be discontinuous, occurring by domain wall motion (i.e. would be "first-order", in analogy with discontinuous bulk phase transitions). Alternatively, as the field increases, a local minimum in U may continuously move toward and meld with an adjacent minimum, resulting in a continuous, ("second order") change of surface state.

Depending on the particular case, there can be several such changes at each surface in a STRUCTURE, leading to many possible field-induced changes of DEVICE STATE. On the other hand, application and removal of a sufficiently low field may not result in the change of STATE, but only the modification of the STATE while the field is on. In general, the field-induced variations in $\phi$ (x,y,z) may be classified as follows:

(i) NO STATE CHANGE (NO) - $\phi$(x,y,z) varies continuously with increasing field, with U vs $\phi_t$ and $\phi_b$ remaining in the same local mininum. For examples, see Section IX F.

(ii) FIELD-INDUCED STATE CHANGE (FI) - As $\vec{E}$ increases from zero, $\phi$ varies continuously until, at some critical field, there is a surface state change. When the field is reduced, this surface state change reverses, leaving the original STATE when the field is removed. For examples, see Section IX F.

(iii) PERMANENT STATE CHANGE (PERM) - As $\vec{E}$ increases from zero, $\phi$ varies continuously until, at some critical field, there is a surface state change. When the field is reduced, this surface state change is completed, leaving a new STATE. For examples, see Sections IX B and C.

In the Sections that follow, PERM changes are primarily indicated and discussed, showing schematically the $\vec{n}$-$\vec{P}$ configuration before and after a field pulse of finite duration. For a sufficiently small field or for sufficiently large surface energies, each of the PERM change and FI change processes will reduce to a NO change process. Such an example is indicated in Section IX F. Alternatively, processes are possible which are successively NO, FI and, PERM with increasing field. Section IX B gives an example. We now discuss particular cases.

B. Devices Employing CIRCULAR CONICAL (C-C) Boundary Conditions

1. N-C² STRUCTURES

Figure 9A:
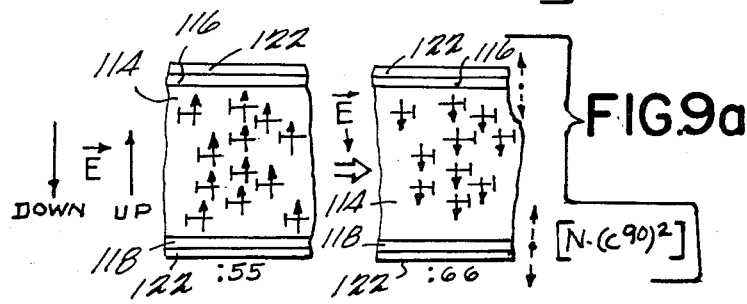
FIGS. 9a–9c are schematic representations of devices with identical CIRCULAR CONICAL boundary conditions.
Figure 9B:
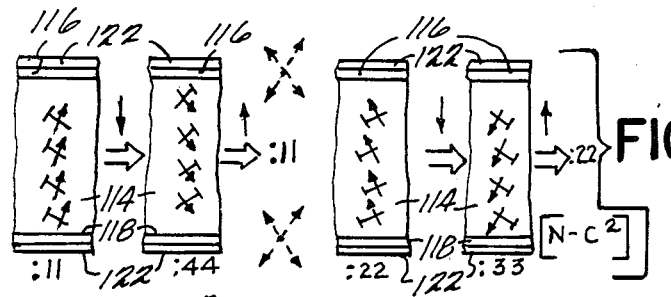
Figure 9C:
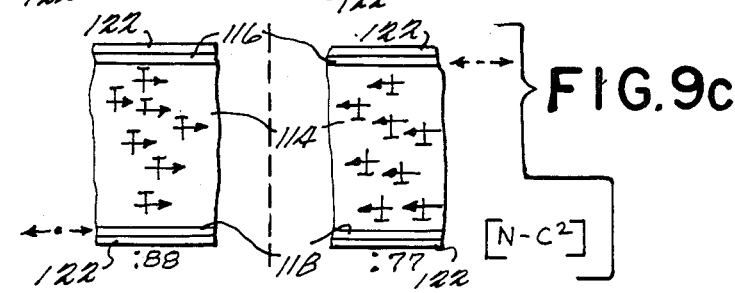

FIGS. 9a-9c show examples of stable DEVICE STATES obtained with $\delta=0$, no intrinsic splay, and identical CIRCULAR CONICAL boundary conditions on both surfaces (N-C²). The special case of the device of said patent, $N-(C^{90})^2$, is shown in FIG. 9a for two of its stable STATES :55 and :66. The horizontal arrows between the STATES indicate transitions induced by finite duration electric field pulses of the direction and magnitude of the accompanying vector. The general case, which is shown in FIG. 9b has, with the same orientations on the two surfaces caused by aligning means 116 and 118, four stable DEVICE STATES, N-C²:11, :22; :33, and :44 for liquid crystal 114. Application of electric field pulses created by electrodes 122 with the electric field directed upward (UP field) will induce switching from STATE :44 to :11 or :33 to :22; a DOWN field will switch from STATE :11 to :44 or :22 to :33. Note that since the field induced torques will rotate STATE :11 clockwise, the next stable STATE encountered will be :44. Once the system is in :44, a larger electric field applied in the same direction will tend to rotate :44 further clockwise, with the angle $\phi$ going to zero for sufficiently large field. When the field is removed the system can return either to the :44 or :33 STATE, depending on random fluctuations. Thus, STATES :22 and :33 will not be reliably accessible if the system is initially prepared in STATES :11 or :44. Similarly, :11 and :44 cannot be reliably reached from :22 or :33. Hence, the field must be kept sufficiently low to maintain the system in either the :11,:44 or :22,:33 pairs of STATES. In either case, what would result is bistable switching similar in character to that of said patent but with two useful differences: (i) upon switching, the reorientation, $2\Delta\chi$, of the projection of the optic axis direction (also given by n̂) on the surface plane will not be $2\Delta\chi = 2\Psi_o$, as in said patent, but will be $2\Delta\chi = 2\sin^{-1}\{\sin\Psi_o\cos[\sin^{-1}(\cos\Omega_o/\sin\Psi_o)]\}$, which in general will be less than $2\Psi_o$. Thus, the optical properties will depend on both $\Psi_o$ and $\Omega_o$, giving more flexibility in the manipulation of the optical properties, for example: (i) choosing boundary conditions with $\Omega_o$ increasing with increasing temperature could reduce the effects of $\Omega_o$ decreasing with increasing temperature; (ii) once switched into any of the four STATES, further increase in the electric field will produce no further STATE change, but will increase $\Delta\chi$, the angle between the optic axis and layer normal projections onto the surface plane. This continuous reorientation of the optic axis about a stable STATE produces a birefringent phase shift that can be continuously varied (TUNABLE BIREFRINGENCE). The accompanying changes in optical transmission would be useful in some applications, for example it would be a way of achieving a partial grey scale in video applications.

In some applications the existence of two independent sets of STATES, (:11,:44) and (:22,:33), could itself be useful. For example, with light incident obliquely to the surface plane, the four STATES will in general exhibit varying amounts of relative phase shift for ordinary and extraordinary polarization and thereby can exhibit different birefringence colors. Hence, an array of :11,:44 areas might perform switching between two colors, while adjacent :22,:33 areas perform switching between a different set of colors. Initial selection of either the (:11,:44) or (:22,:33) STATES could be made by an electric field applied parallel to the bounding plates, by appropriately employing the same electrodes that are used for switching.

For the surface tilt angle, $\Omega_o$, small, and CIRCULAR CONICAL boundary conditions, the stable surface states are states 7 and 8 of FIG. 4b. A device with two such identical surfaces will yield configurations :77 and :88 of FIG. 9c. For low electric field values, either of these structures will yield a continuous variation with E of the average orientation in the liquid crystal layer, $\phi_{ave}$, which is linear about the equilibrium $\phi$ (90° for 8 and 270° for 7). The linear variation of $\phi_{ave}$ will lead to a linear variation in the sample birefrigence. Such DEVICE STRUCTURES should thus be of particular use in obtaining high speed linear liquid crystal electrooptic devices. In addition, for suitably dichroic molecules, a quadratic variation of sample optical absorbance with E can be obtained. Following the arguments of the previous section, it should not be possible to reliably switch between the two STATES $(:77)\rightleftarrows(:88)$ with an E field applied normal to the plates.

2. N-$C_1C_2$ STRUCTURES

Figure 10A:
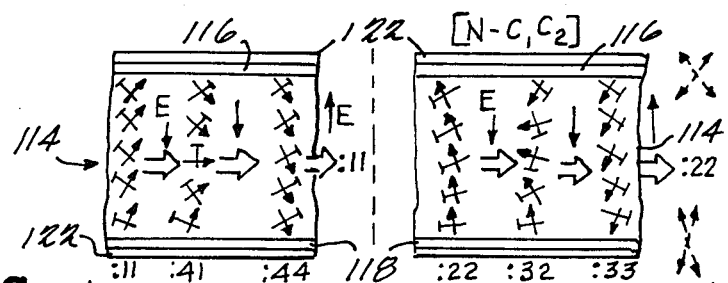
FIGS. 10a and 10b are schematic representations of devices with differing CIRCULAR CONICAL boundary conditions.
Figure 10B:
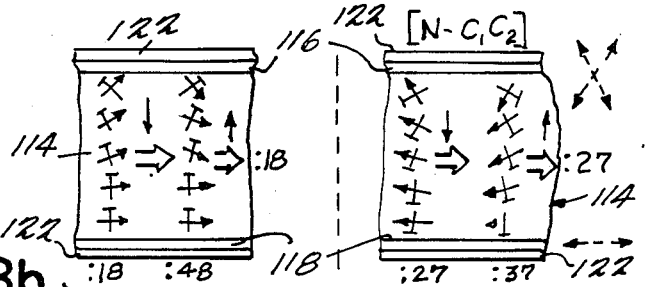

If the boundary conditions are CIRCULAR CONICAL, but with different cone angles, $\Omega_o$, or different surface energy anisotropy, $\Gamma$, on the two surfaces, then the N-$C_1C_2$ STRUCTURES result, examples of which are shown in FIGS. 10a and 10b. Having surfaces of different characteristics leads to an important new qualitative feature of the response of the system to applied electric fields, namely that the surfaces can be switched independently, leading to a larger number of DEVICE STATES that can be induced by electric field pulses. FIG. 10a shows a $C_1C_2$ STRUCTURE with molecules of liquid crystal 114 having different surface tilt angles at aligning means 116 and 118. The application of a DOWN field pulse by electrodes 122 to the :11 STATE will induce switching at the top surface at smaller fields than for the bottom, leading, for some voltage range, to switching to the :41 STATE. A larger DOWN pulse will switch the bottom surface, producing the :44 STATE. Comparing to FIG. 9b, we see that the mixed boundary conditions lead to the possibility of having an extra device STATE with mixed surface states. This third DEVICE STATE has a highly nonuniform director orientation and will exhibit birefringence and optical rotation effects which are distinctly different from the :11 and :44 STATES. In conjunction with crossed polarizer and analyzer, this DEVICE STRUCTURE could produce one extinguishing and two colored DEVICE STATES, or could behave as a three color switch. FIG. 10b shows the case with a small $\Omega_o$ on one surface at which the orientation is either 7 or 8. Applied fields can switch the opposite surface, producing either of the two state devices indicated.

Note a feature common to the :41, :32, :18, and :27 STATES, which also appears in many of the STATES to be described, namely that the director projection onto the surface plane rotates monotonically as one proceeds from one side of the sample to the other. These are called TWISTED SMECTIC STATES, in analogy with the similar director rotation in "twisted nematic" devices. The optical properties of these STATES are discussed later in Section IX F, in connection with the TWISTED SMECTIC STATE of FIG. 8b.

C. Devices Employing UMSYMMETRIC ANISOTROPIC CONICAL (U-U) Boundary Conditions

1. N-$U^2$ STRUCTURES

A striking feature of the devices employing CIRCULAR CONICAL boundary conditions, illustrated in FIGS. 9a–9c, 10a and 10b, is that, with the exception of STATES :55 and :66 which have $\overline{P}$ vertical these STRUCTURES can be divided into two groups, one with the horizontal component $\overline{P}$, $\overline{P}_x$, to the right, the other with $\overline{P}_x$ directed toward the left. Switching between these groups is not possible with CIRCULAR CONICAL or SYMMETRIC CONICAL boundary condition (discussed below). However, with UNSYMMETRIC ANISOTROPIC CONICAL (U) boundary conditions, left-right switching becomes possible, allowing a variety of new devices similar to those of FIGS. 9a–9c, 10a and 10b, but wherein all of the STATES in a given device are electrically accessible.

Figure 11A:
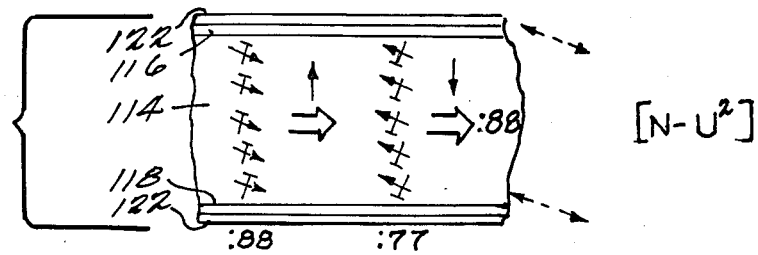
FIGURES 11a and 11b are schematic representations of devices with identical UNSYMMETRIC CONICAL boundary conditions.

If TILTED boundary conditions with $\Omega$ small are used, the N-$U^2$ orientation configurations relative to aligning means 116 and 118 become those of FIG. 11a, showing the clockwise $\phi$ reorientation of both states relative to the CIRCULAR CONICAL case (FIG. 9c). In addition, the surface energy maximum which occurs as $\phi$ is increased from :88 to :77, also rotates from being at $\phi = 180°$ as in FIG. 9c to some $\phi < 180°$ in FIG. 11a. As a result, application of a sufficiently strong UP field with electrodes 122 to :88 can turn $\phi$ past this energy maximum such that when the field is released $\phi$ will rotate to :77. Once in :77, a sufficiently large electric field pulse of the opposite polarity will switch the device back to the :88 by the same reasoning. This switching will produce a reorientation of the effective optic axis for light incident normal or nearly normal to the surface plane that is similar to, but smaller than, that of the device of the original application. Such a small optic axis rotation can be exploited in (simpler to fabricate) large thickness devices (i.e. $d > 10$ μm), made with long pitch ferroelectric liquid crystals. Liquid crystals of long pitch may be created by mixing non-chiral liquid crystal material with chiral materials, or by mixing chiral left and chiral right liquid crystal materials so as to produce a net, slight chiral effect. In addition, the :77 to :88 switching will exhibit a large optic axis reorientation for light incident obliquely and normal to the director, but very little optic axis reorientation for light incident in the plane containing the director. Hence, selection of obliquely incident light is possible.

By employing UNSYMMETRIC ANISOTROPIC CONICAL boundary conditions with $\Omega_o$ large ($> 70°$) it is possible to make a device wherein any of the four STATES, :11, :22, :33, or :44 is obtainable by application of electric field pulses. We consider a DEVICE STRUCTURE with a substantial director tilt angle $\Psi_o \approx 45°$ and UNSYMMETRIC ANISOTROPIC CONICAL boundary conditions modeled by the titled cone of FIG. 3c with a large surface tilt angle, $\Omega_o \approx 70°$ and a small cone axis tilt of $\beta \approx 15°$ parallel to the layer planes ($\gamma \approx 0$). For these conditions there will be four stable STATES, as indicated schematically in FIG. 11b. Comparing FIG. 11b to FIG. 9b, we note that the effect of the surface cone tilt is to rotate clockwise the orientations of all of the STATES. The surface energy maxima between the STATES are also rotated. As a result, application of a sufficiently strong UP field by electrodes 122 to :11 can turn $\phi$ past this energy maximum such that when the field is released $\phi$ will rotate to :22. Once in :22 a moderate DOWN pulse can take the system to :33 as discussed in connection with FIG. 9b. A larger opposite polarity pulse will take :33 to :44, just as discussed for :11 to :22. Switching from :44 to :11 proceeds as for :22 to :33. Hence, with pulses having appropriate peak voltages $V_1 > V_2$, the sequence $V_1$, $V_2$, $V_1$, $V_2$, ... will continuously decrease $\phi$, taking the system around the loop :11, :22, :33, :44, ... The orientation may be stopped in any one of these STATES by appropriately stopping the pulse sequence. In a device having the surface constraint cone tilted in the opposite direction, the opposite sense of rotation will be produced for the same pulse sequence.

Related devices can be made with relatively strong, well known, boundary conditions on one surface, fixing this surface permanently in any of the states 1 to 8 for a field strength that will switch the other surface among states 1 to 4 as described in the previous paragraph.

These various DEVICE STATES can be exploited in conjunction with crossed polarizers to produce birefringence based between four distinct colors, or between three colors and an extinguishing state.

2. N-U$_1$U$_2$ STRUCTURES

Figure 12A:
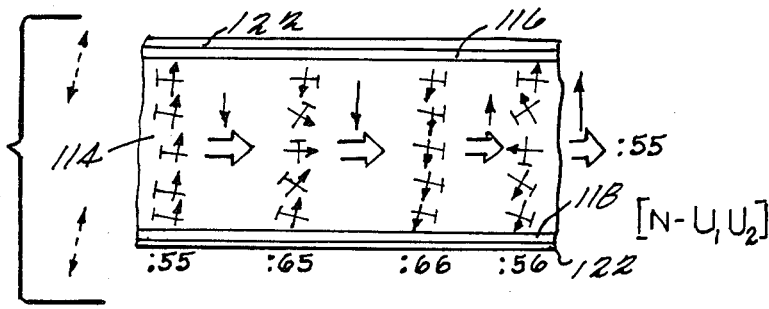
FIGS. 12a and 12b are schematic representations of devices with differing UNSYMMETRIC CONICAL boundary conditions.

As with the CIRCULAR CONICAL boundary conditions, relaxing the condition that the two surfaces be identical leads to a larger number of electrically accessible STATES in U-U STRUCTURES. FIG. 12a shows a four STATE N-U$_1$U$_2$ STRUCTURE with STATES 5 or 6 at the two surfaces, leading to four possible configurations, :55, :65, :66, and :56. If the surface anchoring is weaker or the tilt angle larger at the top surface, then the sequence of these STATES obtained is shown in FIG. 12a. A weak DOWN pulse will switch :55 to :65. A stronger DOWN pulse will switch the bottom, producing :66, and the same sequence with UP pulses will complete the remaining two steps of the cycle.

Figure 12B:
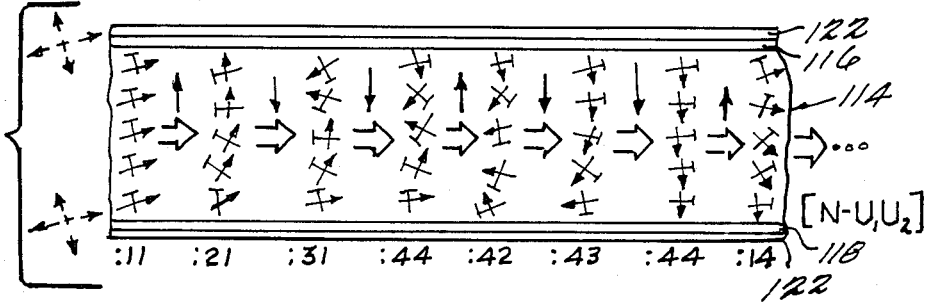

FIG. 12b shows half of the DEVICE STATES achievable with a U$_1$U$_2$ STRUCTURE having STATES 1,2,3, or 4 on the two surfaces. This STRUCTURE has in principle $4^2$ or 16 possible overall STATES and for judicious choice of parameters all can be electrically accessed. The figure shows half of the switching cycle for the case having weaker surface conditions on the top surface. None of these STATES have identical molecular orientation configurations, hence they may be distinguished optically, either by their birefringence or dichroism or both. With appropriate choice of parameters, such a multistate device could be used to produce color or gray-scale effects.

Figure 13A:
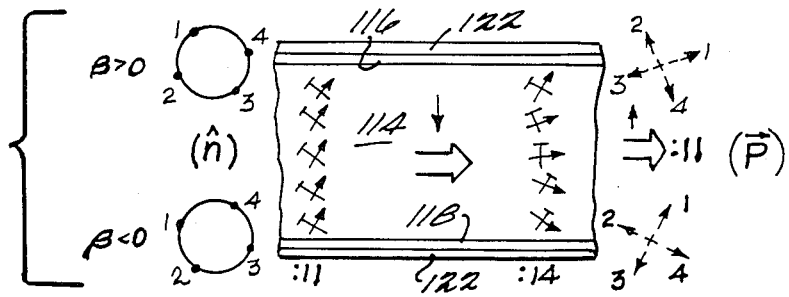
FIGS. 13a and 13b are schematic representations of devices with differing UNSYMMETRIC CONICAL boundary conditions with each aligning means having a different direction of anisotropy.
Figure 13B:
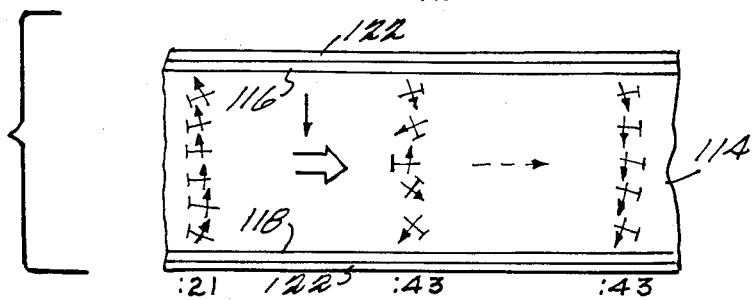

In a U$_1$U$_2$ device, the relative direction of the anisotropy on the two surfaces is another variable of interest. For example, with the -U- boundary condition given by the tilted cone of FIG. 3c, the sign of $\beta$ on the bottom surface can be the same or opposite to that on the top. The sign is the same for the device of FIG. 12a. FIGS. 13a and 13b illustrate the opposite choice wherein the anisotropy introduced by aligning means 116 and 118 are in opposite directions, FIG. 13a showing :11 to :14 switching, and 13b a novel bistable switching sequence, shown starting with :21. A DOWN pulse created with electrodes 122 applied to :21 gives the indicated :43 STATE which has a rotation of $\vec{P}$ of $\approx 360°$ from top to bottom, in contrast to the :44 STATE of FIG. 10b. This state, however, is inherently unstable against a bulk disclination-mediated transition to the :43 state shown to the right in the Figure, and thus could only be used as a transient state. This example shows that the surface state designation does not uniquely characterize a device state.

Figure 14A:
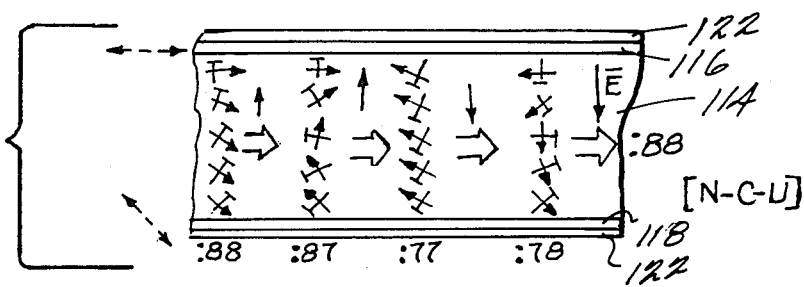
FIGS. 14a and 14b are schematic representations of devices with a CIRCULAR CONICAL and an UNSYMMETRIC ANISOTROPIC boundary condition.
Figure 14B:
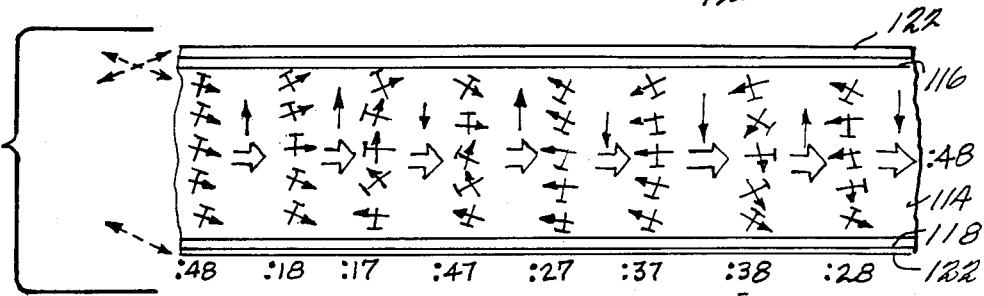

D. Devices Employing Mixed CIRCULAR CONICAL and UNSYMMETRIC ANISOTROPIC CONICAL (C-U) Boundary Conditions FIGS. 14a and 14b show examples of devices with C-U boundary conditions. Having unsymmetric anisotropic tilt at just one surface is sufficient to allow the left-right switching of $\vec{P}$ found in the U-U devices. One such process is illustrated in FIG. 14a which starts with the N-C-U:88 STATE, with aligning means 116 providing CIRCULAR CONICAL boundary conditions and aligning means 118 providing UNSYMMETRIC ANISOTROPIC boundary conditions. With an UP field applied, molecules near bottom surface 118 can be rotated to the 7 state in analogy with the process of FIG. 11a leaving an :87 overall STATE. In this STATE, the overall elastic plus surface energy will exhibit a maximum for $\phi_t < 180°$, where $\phi_t$ is the orientation of molecules at top surface 116, as $\phi_t$ is increased through 180°. Note that the top surface energy alone is maximum at $\phi_t = 180°$ but, because the elastic distortion in the :87 STATE favors increasing $\phi_t$, the overall energy will be lowered by increasing $\phi_t$. If an UP field which is large enough to rotate $\phi_t$ through this maximum is now applied and removed, the orientation of molecules at top surface 116 will relax to the 7 state, leaving a :77 overall STATE. A DOWN pulse will now switch molecules near bottom surface 118 to STATE 8, leaving :78, from which a larger DOWN pulse can switch molecules near top surface 116 back to 8 via the mechanism just described. Thus, a FOUR STATE device is possible.

FIG. 14b shows a N-C-U STRUCTURE with STATES 1, 2, 3, or 4 on the top surface and 7 or 8 on the bottom. All possible combinations of these single surface states are electrically accessible, making this an EIGHT STATE device. The switching mechanisms involved have all been discussed previously, with the 7-8 switching near bottom surface 118 being analogous to the switching in FIG. 11a, and the 1-4 switching near top surface 116 being like that of the top surface switching in FIG. 14a.

E. Devices Employing Tilted Layers (T)

Figure 15A:
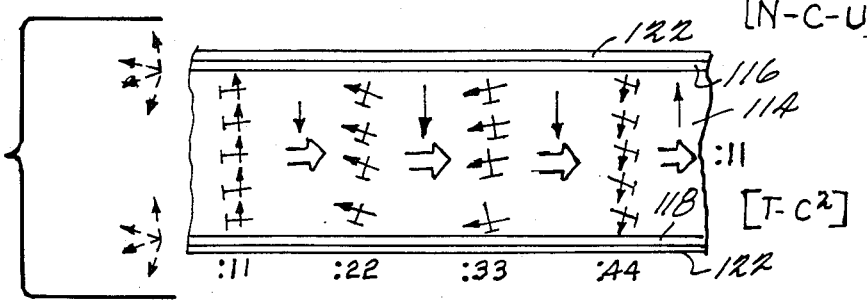
FIGS. 15a–15d are schematic representations of devices with tilted layers.

FIGS. 15a-15d show several examples of the possible STRUCTURES having tilted smectic layers for which the single surface states are those of FIGS. 7a-7d. FIG. 15a shows the DEVICE STATES achievable with identical single surface states 1, 2, 3, and 4, and the layer tilt conditions of FIG. 7b (ii), wherein states 1 and 4 have rotated through the horizontal. This T-C² STRUCTURE has four stable STATES all having the horizontal component of $\vec{P}$ to the left. Any of these states can be switched to any other, with the :22 (:33) being obtained for moderate UP ;DOWN) pulses and the :11 (:44) obtained for large UP (DOWN) pulses.

Figure 15B:
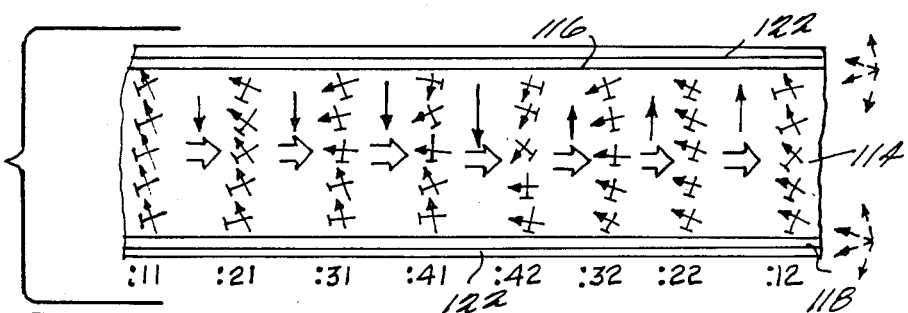

As for the devices of FIGS. 9a-9c, the boundary conditions can be generalized to $C_1C_2$, producing additional field accessible states. If the bottom surface near aligning means 118 has the larger surface energy anisotropy (is the stronger) then the sequence of FIG. 15b, showing eight of sixteen pulse switchable states, is possible. The switching from :41 to :42 in FIG. 15b indicates how elasticity in the bulk can act to favor particular response to applied field. In generating the :41 STATE a strong orientation gradient is introduced into the sample. This gradient applies torques to the surfaces tending to force rotations that will unwind the bulk. Application of an UP pulse acts on the top surface to wind the bulk tighter but acts on the bottom to unwind it. The result is that the field, acting in consort with the bulk elasticity, reorients the bottom surface to reduce the bulk gradient. Hence, in a given situation, the bulk configuration of $\phi$ can influence the switching sequence.

Figure 15C:
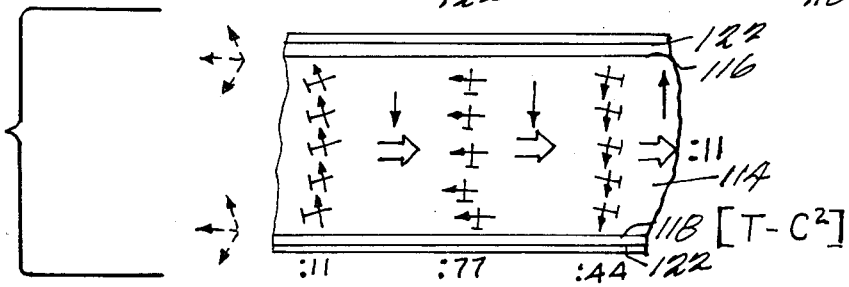
Figure 15D:
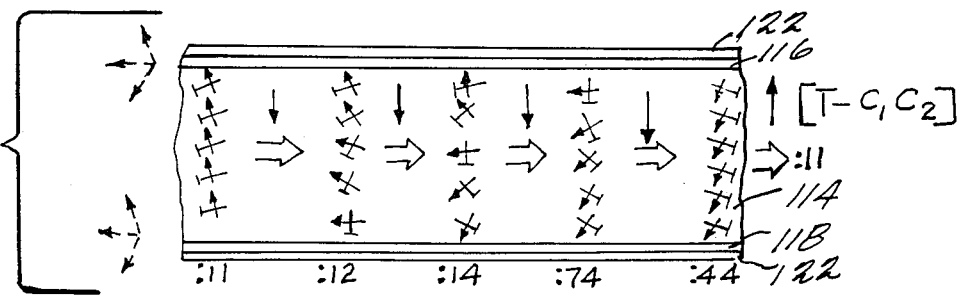

If the single surface states are those of FIG. 7b(iv), i.e. states 1, 4, and 7 with $\vec{P}$ to the left, then devices with an odd number of stable STATES can be made, as indicated in FIGS. 15c and 15d. In FIG. 15d, the bottom surface near aligning means 118 is stronger. F. Devices Employing POLAR (P) Boundary Conditions A POLAR term in the boundary condition can be added to any of the above STRUCTURES and will tend to stabilize those STATES having, at the surface, the preferred direction of $\vec{P}$ relative to the surface normal. For example, in FIG. 10a, a POLAR interaction forcing $\vec{P}$ to be directed in from bounding planes 116 and 118 will stabilize STATES :41 and :32 relative to the others. Hence, the POLAR interaction may be used to adjust and balance the relative stability of various STATES. Strong POLAR interactions will stabilize the STRUCTURE N-P²:56 of FIG. 8b, producing a single STATE STRUCTURE which has useful electro-optic properties. In the zero field state, which is TWISTED SMECTIC (cf. Section IX B 2), the director, when projected onto the surface plane, makes a rotation of 2 $\Omega_o$ as one proceeds from one side of the liquid crystal layer near plane 116 to the other near plane 118. This "twist" of the director projection is similar to that found in many other of our devices (cf. FIGS. 10a-13b) and is similar to that introduced into twisted nematic cells. It is well known in the art to produce a simple rotation of the plane of polarization of light, if the distance over which significant rotation occurs is long compared to the wavelength of the light (Mauguin limit). In the case of very thin cells (d≈several μm) this condition is only roughly satisfied but the polarization rotation is still generally observed, with the exiting light being slightly elliptically polarized. Application of an UP or DOWN field will rotate the polarization in FIG. 8b to the :55 or :66 STATE, respectively, with the field on, the STRUCTURE being a uniform uniaxial slab with different orientations in the two cases. These three STATES thus offer quite distinct optical properties. The response of the :56 STATE about the equilibrium STRUCTURE is linear for small fields, so that this STRUCTURE can give high speed linear electro-optic effects.

G. Devices Employing Combinations of Ferroelectric and Dielectric Torques

As an example of a device employing both ferroelectric and dielectric torques, consider FIG. 9b which can be ferroelectrically switched between the :11 and :44 STATES. For fields larger than the crossover field the dielectric torques will dominate and the director will reorient, :11 to :88 and :44 to :88. Thus, as a result of the dielectric torques, one additional field-induced STATE is available. An additional effect of the dielectric torques will be the field induced tilt of the layers. Once STATE :88 is obtained the director, the axis of largest $\epsilon$, makes an angle 90° − $\Omega_o$ with the electric field, implying a field induced torque parallel to the layer planes. This torque will act to rotate the layers which, in turn, will vary the sample birefringence, producing in this case a quadratic electro-optic effect. Dielectric torques may also be used to enhance the switching speed by increasing the electric field amplitude when the orientation $\phi$ is such that dielectric torques couple more strongly to the field than ferroelectric torques (e.g. for $\phi \approx 45°$).

H. Device Variations

1. Boundary and Layer Tilt Conditions Approximating Those of U.S. Pat. No. 4,367,924

In said patent the boundary and layer tilt conditions were respectively $\Omega_o = 90°$ and $\delta = 0°$. Some preparation techniques will closely approximate these conditions while not satisfying them exactly. For example, aligning the layers with a magnetic field which is not precisely parallel to the surface planes will produce a structure having $\delta \approx 0°$. Alternatively, some surface treatments might produce an $\Omega_o$ close to, but slightly less than 90° or there may be a slight POLAR contribution to the boundary condition. In any of these cases, the operation of the device will be essentially the same as in said patent. That is, the conditions $\Omega_o = 90°$ and $\delta = 0°$ need not be exactly satisfied for a device to operate essentially as in said patent, switching between :55 and :66 states. The range of deviation from the original values of the angles $\Omega_o$ and $\delta$ over which operation as the original device will obtain will depend on the particular situation, but deviations of less than 5° should in most cases yield devices operating essentially as in said patent.

2. Devices with Pretilt

An additional possible use of TILTED boundary conditions as in the STRUCTURE of FIG. 9b is the establishment of pretilt. Considering FIG. 9a, the application of a DOWN field to :55 will induce switching to :66. However the switching could proceed by either clockwise ($\phi$ decreasing) or counterclockwise ($\phi$ increasing) rotation. Adjacent regions switching in these opposite reorientations would end up separated by a 360° disclination wall in the $\phi$ field once the switching was completed. The presence of such walls, which may have to travel long distances to coalesce and anneal away, will generally slow the completion of the switching process. Pretilting the director with TILTED boundary conditions, such as for the :11 state of FIG. 9b, forces the reorientations to go in one of the directions (clockwise for the :11 state), thereby eliminating the disclination walls and speeding switching.

3. Devices with Nonhomogeneous Bounding Plates

Up to now DEVICE STRUCTURES have been described which are homogeneous in the sense that the surface treatment and liquid crystal layer thickness are the same everywhere on the bounding plates. Device variations with novel properties can be made by relaxing either or both of these homogeneity conditions.

Consider first a device having a liquid crystal layer thickness which is variable, having, for example, one of either two thicknesses. Means for accomplishing this are discussed in Section X B. Altering the liquid crystal layer thickness affects both its optical properties and the characteristics of its response to electric field. For example, in any of the devices having uniform director orientation (c.f., FIGS. 9a–9c), disposition of the liquid crystal layer between crossed polarizers with white light incident, yields transmitted light, the color of which depends on the thickness according to the well known birefringence color sequence. Hence, different colors of light can be produced by different parts of the liquid crystal layer, as determined by the local layer thickness. Devices employing this technique to generate color are discussed in Section X B.

On the other hand, changing the thickness can strongly affect the switching characteristics, changing the electric field in the liquid crystal for a given applied voltage, and changing the energies and dissipation of the molecular reorientation. For example, consider that POLAR surface interactions stabilize a 180° rotation of $\vec{P}$ across the sample in the :56 DEVICE STATE of FIG. 8b. If the sample thickness is reduced, increasing torque is required at the surface to maintain the state. Eventually, at sufficiently small layer thickness, the maximum surface torque will be reached and the state will unwind into the :55 or :66 STATE, becoming uniform. As this critical layer thickness is approached, the electric field required to unwind the 180° rotation will decrease, lowering the voltage required for a state change.

Alternatively, the required voltage can be lowered by weakening the POLAR surface interaction strength, so that, in a structure with a nonhomogeneous surface treatment yielding weaker POLAR interactions in some regions, these regions will switch (unwind) first as the applied electric field is increased, and return to the :56 state last as E is decreased. This nonhomogeneity can be different on the top and bottom plate, such that one region has a weaker top surface and therefore a lower voltage threshold for the field-induced :56→:66 transition than for the :56→:66, and, in another place, a weaker bottom surface and the opposite threshold behavior. It is evident that, by varying the conditions over the bounding surface, a given single structure can locally exhibit many of the field-induced reorientations described in FIGS. 8a through 15d. Application of these ideas in device switching is discussed in Section X E.

Nonhomogeneous surface treatment may also usefully serve as a tool for obtaining uniform alignment of the smectic layers, as will be discussed in Section X E.

Finally, in addition to surface treatment and sample thickness, the layer tilt may be varied nonhomogeneously, producing the variability discussed above for tilted layers in attainable local STATES.

4. Devices Employing Temperature as a Variable Parameter

We consider here devices in which heat pulses are applied to the liquid crystal layer, either electrically or optically, while in a given DEVICE STATE or during a STATE change.

Such a temperature variation can alter the optical properties of a DEVICE STATE, primarily by changing the smectic tilt angle, $\Psi_o$, giving a single electrically addressed STATE the possibility of exhibiting several, or a continuum of optical transmissivities or colors. Specific effects are discussed in Section X D.

Alternatively, heat pulses can be used alone or in conjunction with field pulses to switch between DEVICE STATES. Consider, for example, the device of said patent employing a material such as DOBAMBC in the ferroelectric smectic F phase. Employing the F phase has the advantage that it exhibits very strong bistability, but the disadvantage of very high viscosity and consequent slow switching. This latter difficulty can be overcome by heating the material into the smectic C phase during the switching pulse, making use of its much lower viscosity and faster switching. Calculations of thermal response are available in the art (D. Armitage, *Journal of Applied Physics*, Volume 52, pp. 1294–1300, 1981), and indicate that a 1 micron thick liquid crystal layer could be heated $\simeq 20°$ C. and cool within $\simeq 10$ microseconds. On the other hand, a heat pulse alone, taking the smectic up to the A phase, could be used to switch a metastable STATE (e.g. :65 of FIG. 12a) to one of lower energy (:55 of FIG. 12a).

X. EXAMPLES OF SSFLC DEVICES

A. Introduction

The fast electro-optic switching of the SSFLC geometry has device potential in several areas of electro-optics. Flat panel SSFLC displays can be made active (with built-in light source and working in transmission) or passive (using ambient light to work in a reflective or absorptive mode) with applications to instruments and gauges, oscilloscope and radar screens, screens for computer and word processing systems, monochrome or color television, etc. Other applications include any of those where the twisted nematic has been demonstrated or proposed, but higher response speed is needed, such as fiber-optic switches, optical and acoustical detectors, and incoherent-coherent transducers. To cite a further example, SSFLC switching promises to eliminate the major stumbling block of parallel optical processing, namely the slow speed of available light valve arrays. In this section, we discuss some specific applications of the various DEVICE STRUCTURES and DEVICE STATES of this application and said patent.

B. Applications of Devices Employing Two-State Pixels

Here applications of SSFLC devices are discussed employing pixels which exhibit two optically distinct DEVICE STATES. These two states may differ by either temporary or permanent field-induced change of bulk or surface orientation. These distinct possibilities were detailed in Section IX A.

The term PIXEL means any contiguous discrete electrode area over which a uniform electric field can be applied to the liquid crystal. Examples of electrodes employed in the art include patterned conductive layers (aluminum, indium tin oxide, etc.), and active semiconductor elements such as thin film transistors, photodiodes, or photoconductors.

The term OPTICALLY DISTINCT in connection with device states means that either the transmissivity or reflectivity of a combination of the liquid crystal layer with polarizers, birefringent plates, and/or dichroic dyes changes upon switching from one state to the other. These chanqes, $\Delta T$ and $\Delta R$, respectively, will, in general, depend on the wavelength of light employed.

With monochromatic light incident, two-state pixels can be used to switch between two intensities. With white light incident, because of the wavelength dependence of $\Delta T$ and $\Delta R$, two-state pixels can switch between two colors. Special cases of two-color devices are: (1) black and color or black and white devices, distinguished by one state which is extinguishing or nearly so; and (2) color and white devices.

1. Device in U.S. Pat. No. 4,367,924

The original application describes the first kind of device, switching in transmission between an exstinction state and a color/white state using two crossed polarizers and the liquid crystal birefrigence. The application also points out that the device will operate in a reflective mode. The color is a birefringence color determined by the combination of liquid crystal material and layer thickness, and polarizer setting. Apart from the initial prototypes, devices of this kind have been made and are illustrated in N. A. Clark, M. A. Handschv, and S. T. Lagerwall, *Molecular Crystals and Liquid Crystals,* Volume 94, pp. 213–234, 1983.

With crossed polarizers, excellent extinction can always be achieved with one of the polarizers parallel to one of the director states, e.g. :55 in FIG. 9a. Thus, as illustrated in FIG. 16, liquid crystal 114 is sandwiched between aligning means 116 and 118 which creates state :55 or :66. Polarizers 129 and 131 have polarization directions perpendicularly oriented. State :66 is enterable by applying a voltage across sample electrodes 130 and 132, can then be made to produce the colors in the well known birefringence color sequence at the liquid crystal layer thickness indicated: first order white ($\approx 0.5$ $\mu$m), yellow ($\approx 1.0$ $\mu$m), purple ($\approx 2$ $\mu$m); second order blue (>2 $\mu$m), yellow, red; third order green, etc. The indicated layer thickness figures are approximate, depending on the liquid crystal optical anisotropy and tilt angle, and, thereby, on the temperature for many substances. The second order colors are less sensitive to changes in these parameters than the first order colors.

2. Non-Emissive Screens

The ergonomic problems connected with the use of available CRT terminals have prompted search for ways of developing NON-EMISSIVE screens, alternatively called passive screens. These have to work in reflection and the principal constituent of the screen has to be rapid because, in general, many elements have to be addressed for every frame updating. It is clear that the SSFLC structure here offers one of the most attractive solutions. Although the principles are already contained and mentioned in the original application, and thus nothing basically new can be added here in this paragraph, we nevertheless want to give some concrete examples, in order to illustrate how the practical design and the properties of the screen may vary.

Figure 18:
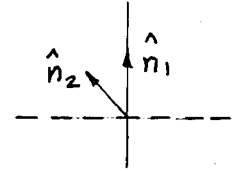
FIG. 18 is a diagram for explaining the operation of the device in FIG. 17.
Figure 18:
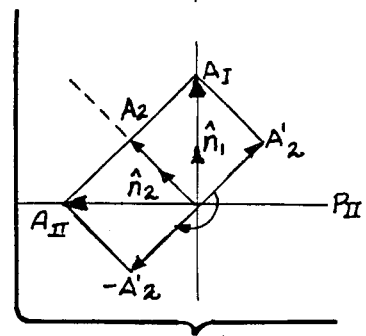

A reflective device, as illustrated in FIG. 17, using just one polarizer 136—in the front—is optically equivalent to a transmissive device with twice the layer thickness between parallel polarizers. Thus, in FIG. 17, aligning means 116 and 118 sandwich liquid crystal material 114. Reflective surface 134 on aligning means 118 operates together with single polarizer 136 which may be incorporated in aligning means 116. It gives thus a wave-length independent full transmission for the same condition (when the thickness corresponds to a relative phase change of $A'_2$ to $-A'_2$ leading to outgoing amplitude $A_{II}$ for ingoing $A_I$ in one pass, cf. FIG. 18) as the transmissive device with crossed polarizers gives wave-length independent extinction: with $\Psi_o \approx 22°$ as an example (FIG. 18) and the polarizer ($P_I$) set parallel to the $\hat{n}_1$ (e.g. :55) director state (white) the reflected intensity in the $\hat{n}_2$ (:66) state is given by $I = I_o \sin^2 2\pi \Delta nd/\lambda$, which would give (second order) blue characters against a white background for a layer thickness of about 1 $\mu$m. Dark violet characters, fairly well approximating black, will result for a somewhat thinner layer. Strictly black, in the sense of extinction for all visible wavelengths would require two polarizers. With a different orientation, the single polarizer can also be used to give switching between two colors, rather between white and a color.

The reflective screen with one polarizer is somewhat brighter and has a superior viewing angle as compared to a twisted nematic screen, and, since updating is required only if a pixel is to be changed, it would be extremely flicker-free, which is a condition hard to obtain with a CRT. The device would conveniently be built with an internal reflector. If the reflective device ought to switch between black and color, a second polarizer is required, in crossed position behind the SSFLC layer ($P_{II}$, FIG. 18). The brightness is now the same as for a twisted nematic device, with viewing angle (and, of course, speed) still strongly advantageous.

For a screen with black letters on a white background, an attractive design would employ a 45° tilt material together with a black dichroic dye and in combination with only one polarizer. The polarizer can either be in front or in the back. In the first case as illustrated in FIG. 17, the bright (nonabsorbing) state as illustrated is switched to the dark one with directors oriented at 90° with respect to the directors in FIG. 17, with a contrast ratio given by the ratio of transmission coefficients for the dichroic molecule oriented with its long axis respectively normal to and along the optical electric field vector. With the polarizer behind the SSFLC layer (FIG. 19), unpolarized light enters the cell, where the medium, with the directors oriented as illustrated, serves as a kind of polarizer admitting mainly vibrations parallel to the polarizer (P) direction of polarizer 136. With the directors in the other position, the medium instead works as a polarizer crossed relative to P. This last design not only gives excellent brightness and viewing angle, but permits the black characters to be perceived as being in the outermost surface of the screen. Such a screen (which naturally should have an anti-reflective coating) would therefore have a very appealing and pleasant appearance to the eye.

In connection with the development of nonemissive screens capable of color, it is interesting to note an intrinsic advantage of SSFLC structures in the reflective geometry with a single polarizer, namely that, because there are two passes through the liquid crystal layer between polarizers, the birefringence colors are obtained which are optimum with regard to saturation (the second order blue through third order green), while maintaining the advantages of a thin liquid crystal layer (thickness $\approx 1$ $\mu$m).

3. Color Devices

Devices are here discussed having one or more liquid crystal layers in combination with polarizers or filters to produce color when illuminated in reflection or transmission. For reasons of simplicity, it is an advantage if a color device can be made with just one layer of liquid crystal.

One way of achieving a color screen in a single layer device is to use some of the possible device structures giving continuously field-variable birefringence (TUNABLE BIREFRINGENCE, cf. Section IX B 1), and applying to each pixel, e.g. with a thin film transistor array, the voltage required for the color desired at any given time. Tunable birefrigence is a method to produce colors well known in the art of nematic liquid crystals, but only the use of the surface SSFLC switching can make the cells fast enough to permit development of multi-pixel or matrix screens with sufficient contrast and viewing angle.

Another method of producing color on a screen, likewise well known in the art, is to use the liquid crystal element as a shutter in combination with filter elements for the three primary colors distributed as an orderly array over the whole screen (T. Uchida, et al., *Proceedings of the* 1982 *International Display Research Conference,* SID/IEEE, pp. 166–170, 1982). For a screen in transmission mode the essential difference when replacing the nematic with the surface stabilized ferroelectric will be increased speed and viewing angle. For a screen in reflective mode an additional difference (apart from technical details such as choice of different colors in the mesh) will be that the SSFLC screen (one polarizer) will be brighter than the twisted nematic screen by a factor $T^{-2}$, where T is the transmission coefficient for the polarizers used. This higher brightness is a general feature when SSFLC (operating in white/quasi-black mode) and TN reflective devices are compared.

A different approach to the color screen without using filters would use the SSFLC geometry with nonhomogeneous bounding plates, as discussed in Section IX H 3, for example, just the DEVICE STRUCTURE of said patent, but with a varying sample thickness, which is just a juxtaposition of many devices of the kind described in said patent. Additionally, any other device structure with uniform orientation could be similarly employed. In this design, every pixel would operate between a chosen color state (any of the birefringence colors, including first order white) and a black state (dark blue for the reflective case with a single polarizer) but the local pixel color would vary due to a spatially varying liquid crystal layer thickness. A periodic variation in thickness can be obtained by evaporation of steps in two directions, e.g. in a constantly repeated 2×2 pixel arab (FIG. 20a). Each such set of four pixels can then represent extinction or one of either four colors (1,2,3,4, e.g. 3 colors and white), or three colors (1,2,2,3), depending on whether or not the steps are unequal or equal in height in the two directions. The color of different areas on the screen is now generated by mixing or merging as in a common television tube: depending on the observation distance to the screen, one has to make the color pattern fine enough not to be resolved by the eye. The device will work equally well in reflective as in transmissive mode. Needless to say the array unit does not have to be square (see FIG. 20d) and could be made with a larger number of pixels, e.g. 4×4 (see FIGS. 20b and 20c) permitting more colors with finer resolution between them. Thus, in FIG. 20b, liquid crystal 114 is between even thickness aligning means 116 and multi-thickness aligning means 118 which has a basic unit of four different thicknesses in each of two directions.

Instead of using variable thickness, similar devices could employ a nonhomogeneous selection of available surface states, such as discussed in Section IX B 1.

As pointed out in said patent, two ferroelectric layers sandwiched over one another and separately controlled give rise to 2×2 possible different colors. The device in FIG. 21a has liquid crystal layers 114a and 114b in the same orientation between aligning means 116, 138 and 118 and gives the four states indicated with two pairs of electrodes 140 and 142, which in transmission between crossed polarizers in aligning means 116 and 118 (one of the polarizers being perpendicular to the directors in one of the states) would give one black (extinction) and three primary color states. It works equally well in reflection giving white plus three primary colors with just one front polarizer.

The same performance is achieved by the variation of FIG. 21b where the smectic layers are tilted 2$\Psi_o$, relative to each other so that only one of the director states is common to both. For this geometry however, another possibility may be pointed out (FIG. 22a): equipped with only two electrodes (i.e. one pair with no midway electrodes between the layers, thus only driven by one electric field) both layers cooperate to give at least three distinct states, corresponding, in the case of monostable devices, to (1) no field, (2) down field and (3) up field. And they do this also in reflection with only one polarizer. Furthermore, a substance with $\Psi_o = 45°$ and dichroic dye addition would, in the same mode, give rise to three "gray-scale" states of the color given by the dye (FIG. 22b). The devices can be made monostable using boundary conditions enforcing a single molecular orientation at each surface, stabilizing the :55 state in one layer and the :66 state in the other. They can also be made multistable by employing switchable (e.g., CIRCULAR CONICAL) boundary conditions with different thresholds for the two layers, making the :55-:55, :55-:66, :66-:55, and :66-:66 states for the two layers obtainable.

C. Devices with Multi-State Pixels

1. Twisted Smectic Devices

If a single-layer device is to produce any color, it has to have at least three optically distinct states. Several one-layer devices with this property can be found among the structures described in Section IX B 2, characterized by different boundary conditions on the two surfaces, and many variations of what we have termed TWISTED SMECTIC structures are capable of at least three states.

One of the simplest twisted smectic device structures is depicted in The lower and upper boundary directors, $\hat{n}_1$ and $\hat{n}_2$, respectively, are locked in two directions, for instance by SiO evaporation (cf. Section IV C), making the angle $2\Psi_o$, and the boundary conditions are assumed to be strong. In this geometry which is the one of FIG. 8b, each smectic layer has a 180° change in $2\Psi_o$ from plate to the other. The field free (or weak field) state essentially guides the light polarization back and forth (cf. Section IX F) in a device with internal or back reflector, which gives a certain color with convenient setting of the front polarizer (such as in the general arrangement in FIG. 17). With a strong applied up field, the director everywhere (except a thin boundary layer at top plate 116) will go into the $\hat{n}_1$ direction giving a second color. With a strong applied down field, below the threshold for change of state at the bottom plate, the director everywhere (except a thin boundary layer at bottom plate 118) will go into the $\hat{n}_2$ direction giving the third color. This color may also be achieved via a field-induced change of state at the bottom surface for above threshold fields. Operation involving a state change will be of advantage in multiplexed devices requiring maximal nonlinearity of response. In FIG. 23, $\Psi_o$ has been chosen to be 45° without any limiting consequences for the discussion. The polarization rotation angle is $\simeq 2\Psi_o$ and could be changed by controlling the temperature for a substance with a C-A transition.

Some twisted smectic devices, such as those of FIG. 10b, can be driven as two-state devices and have advantages over the ones already described, if the required function is the rotation of the polarization plane in either the left or right sense depending on the applied field.

To mention one of the many further possibilities, suppose the bottom and top plates were treated differently in order to make the switching threshold different at the two plates. It could, for instance, be made by washing the bottom plate with acetone, while applying a hydrocarbon treatment to the upper one. Alternatively, one could use SiO evaporation in two directions (giving stable director orientations $\hat{n}_1$, $\hat{n}_2$) for the bottom plate and in one direction ($\hat{n}_3$) at the top plate. In either case there would be a strong tendency to enforce one of the cone directions 1 and 2 in FIG. 24a at the bottom plate and a much weaker tendency at the top plate, or even a tendency to prefer direction 3 if the torques arising from the twist deformation in the director field were not too strong. The general result is that the switching on the bottom surface occurs at higher fields than on the top surface. This gives the switching sequence that can be exemplified by FIG. 12a, with the director orientations in FIG. 24b, three of which, for instance (i), (ii), and (iii) can be achieved from one another in one step, while the transitions between (i) and (iv) have to go via one of the other two states.

2. Other Multi-State Devices

Figure 11B:
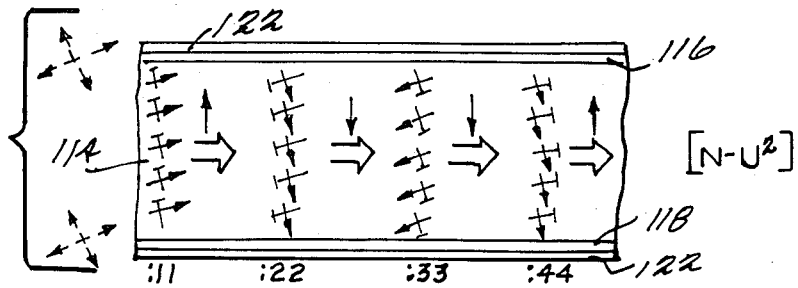

Color screens employing single liquid crystal layers can be devised using some of the possible device structures giving multiple states, each of which has uniform director orientation, for example the four state device of FIG. 11b, which presents four distinct orientations of the optic axis and thus can exhibit four distinct birefringence colors, one of which is extinction when employed in devices similar to FIGS. 16, 17 and 19.

The multistate structures having some states of nonuniform orientation will also yield distinct color effects when employed with one or two polarizers. However, the multitude of possible cases renders any individual discussion impractical beyond what has been outlined in Section IX.

In general, controlled inhomogeneities in surface treatment or layer tilt, as discussed in Section IX H 3, can be used to effectively increase the number of states available in a multistate device. Consider, for example, a pair of pixels, a and b, both subject to the same applied field, and both having the equilibrium structure of FIG. 8b, but with pixel b having a weaker surface energy anisotropy and an overall structure as illustrated in FIG. 16, 17 or 19. Then, as the field is increased, as a pair (a-b) they will exhibit the following sequences of five combined states: :66-:66, :66-:56, 56-:56, :56-:55, and :55-:55. Hence, the combination of two non-identical three state pixels with the same field applied yields a five state device. This is advantageous in that it reduces in half the number of electrical connections required to get five states over the case with identical pixels.

D. Non-Matrix Arrays

One of the simplest applications, with essentially only one pixel (one large electrode) is an optical switch using total internal reflection. It is known in the art (R. A. Soref, *Optics Letters*, Volume 4, 155–157, 1979, R. A. Soref and D. H. McMahon, *Optics Letters*, Volume 5, 147–149, 1980), that the optic axis in a thin nematic liquid crystal layer between a pair of trapezoid prisms can be switched by an electric field so that a light ray is transmitted or totally reflected from the incident direction into another one, because of the change in the effective index of refraction of the liquid crystal layer. A similar but more rapid switch can be made with the SSFLC with the difference that the optic axis is rotated perpendicular to, and not in, the plane of incidence. The angle of rotation is $2\Psi_o$. Thus, for a 45° substance, the effective interlayer refraction index can be changed, for a polarization perpendicular to the plane of incidence, by the amount ne-no, for $\Omega_o < 45°$ by a smaller amount. With a dichroic dye mixed in, the transmission could instead be changed for light having the orthogonal polarization. In contrast to any device using nematic liquid crystals, like the one referred to above, or any other device known today using other electro-optic materials, this device would satisfy two requirements presently sought for in optical switches used in optic communications systems: (i) high switching speed (well above the kHz range); and (ii) large refractive index change ($\Delta n$ up to $\simeq 0.3$).

Another, in principle quite simple, but also one of the most attractive possibilities for advanced application of SSFLCs is a sandwich of ferroelectric liquid crystal and photoconductor acting as a light-light transducer, e.g. transforming incoherent light into coherent. For this application, no complicated pattern of electrodes is necessary (or even desirable) but the liquid crystal can either be in direct contact with the photoconductor or in indirect contact via a thin evaporated surface layer for aligning purposes. In order to have an equally rapid backswitching when a certain area is no longer illuminated, a small bias voltage has to be applied to the sandwich.

Next in simplicity to those devices having only one pair, or a few pairs, of electrodes, are linear array devices. These have a considerable potential in printing and copying applications and could, for instance, use pixels on a scale of 100 μm or finer resolution, arranged on a line containing 1000 pixels or more, covering the whole width of the text page, image or photograph that has to be printed. Also in this case the device has been demonstrated, but due to the slowness of the nematics used, the speed involved is at best ten times slower than a high speed xerox-type machine. With the resolution mentioned above, and a switching time of 30 μs which is even a fairly conservative estimates for the surface stabilized ferroelectric liquid crystal, the printing rate would instead be=3 meters/second, about 10 times faster than the fastest xerox-type machine, corresponding to about 1000 pages per minute. The pixels could be operated between two or more states as a shutter for black and white pictures or, using the fast tunable birefringence, as switchable color filter points for producing a color picture, e.g. by exposure to a film. Because of the high rate of information transfer that is possible when a linear array is scanning a whole page in a single pass, instant black and white or color photos can be cabled from satellites or between continents or even projected on a luminescent screen in real time.

If the linear array is using two state pixels and if it is desired to step up the shutter performance to controlling a gray scale, combinations of pixels can be used together with optics which combine the light coming from several pixels, as exemplified by the cylindrical lens 154 of FIG. 25. In FIG. 25, lens 154 combines the output of one pixel 150 with the output of a corresponding pixel 152. The two pixels give three levels of luminosity at the focal point. Four pixels would give five levels but also require four electrical leads to each array element. In this application, a combination of pixels with a single common electrical connection but different switching thresholds, as discussed in Section X C 2, could be used to advantage. With the example discussed in Section X C 2 (combination of the N-P$^2$ pixels) array elements with five overall states could be addressed with a single voltage.

An altogether different design of a linear array is described in FIGS. 26a and 26b. It employs a 45° tilt material with a dichroic dye and switches between an absorbing and a non-absorbing state for light along the k direction. The electric field has to be applied along the b̂ direction by a set of interdigitated electrode stripes 156 in FIG. 26b, the geometry of which defines the array. Each pixel could for instance measure 5×5 μm. This kind of design has the characteristic of not using any polarizers at all. If used instead with electrode plates parallel to the a-b plane this layer geometry may be used to control transmitted light perpendicular to the applied electric field.

Finally, a method to produce color (cf. Section IX H 4) will be discussed that, although of greater general applicability, may be most practical for a linear array. If a substance with a C-A transition is not too far below the transition point, an applied heat pulse will change the optic axis, according to FIG. 27a, from the actual $\hat{n}_1$ direction, say, to nearby direction $\hat{n}_1'$, shifted towards the state ($\hat{n}_3$) representing the A phase. The idea is thus to use temperature as an additional control variable which, in a sense, makes a pixel with two device states capable of becoming a multi-state pixel. The simplest case is for $\hat{n}_1' \approx \hat{n}_3$ (it is unimportant whether the A phase is reached or only approximated) giving three different states as in FIG. 27b. By controlling what fraction of the time each pixel is in one of the three states, any color can be produced, but the modulation of heat pulses can also be performed such that advantage is taken of the continuous color changes possible. In fact, a TUNABLE BIREFRINGENCE situation exists where the variable temperature controls color (by rotating n along an axis parallel to the incoming light) in a way that is similar in its effect as when the director is rotated continuously (though around an axis perpendicular to the light beam) by changes in a controlling electric field across a nematic liquid crystal. Thus, from the $\hat{n}_3$ state the medium goes back, in a monostable fashion, to whichever and $\hat{n}_1$ and $\hat{n}_2$ has been preselected by the momentary electric field. For the application to matrix displays, the method of thermal switching between the smectic F and C phases, already mentioned in section IX H 4, is probably the more attractive one.

FIG. 28 illustrates an example of such a device. Attached to aligning means 116 are heating elements 154 overlayed with electrodes 156. Insulators 158 provide electrical isolation therebetween. Similarly, attached to aligning means 118 are heating elements 160 overlayed with electrodes 162 and separated by insulators 164. As would be readily apparent to those skilled in the art, heating elements 154 and 160 and electrodes 156 and 162 may be positioned in any of a plethora of possible manners.

E. Design and Preparation of Cells

The device design and technology can be very different depending on the function and on the operational qualities desired of the device. The applications described in the last section in principle require only simple electrode patterns and, at least for most working conditions, relatively simple surface treatment. In other cases not only the electrode configuration might be much more complicated, but also matched by a complicated pattern in the surface treatment, permitting for instance different switching properties on different regions of the surface. In again other cases, the patterning of electrodes and of the surface treatment may be combined so as to take advantage of the area not used for switching to perform alignment functions over the active electrode areas. An example of this method will now be provided, employed to align the smectic C layers.

The method to be described combines two kinds of surface condition on the plates with either an external field or the use of the A-C phase transition. A different surface condition is employed at areas exterior to the switchable (electrode) areas in order to control the layer direction, but not the director, over the electrodes. FIG. 29 illustrates this for parallel stripe electrodes 166 at a single surface 118'. The surface treatment of the stripes is reduced to careful cleaning by acetone (avoiding all surfactants) whereas areas 168 in between are evaporated obliquely with SiO in order to lock the director in a certain direction ($\hat{n}_0$), exemplified in the figure. (Top plate 116' can be treated correspondingly to give the same direction, $\hat{n}_0$). The difference in surface treatment can be achieved by evaporation through a mask, or by standard photolithographic techniques. If now the employed substance 114 has both a smectic A phase and a smectic C phase, the A phase will grow with the layers perpendicular to the $\hat{n}_0$ direction upon slow cooling from either the nematic or isotropic phase, establishing this layer direction over the entire surface. In the latter case a strong stabilizing magnetic field should be applied along the $\hat{n}_0$ direction. On the other hand, over the electrodes, the director will go into one of the switchable states given by the boundary conditions there. Thus, appropriately treating part of the surface for strong alignment, orients the smectic layers in a unique direction over the entire sample while permitting a high degree of director freedom over the active (electrode) areas.

In the case that a smectic A phase is absent in compound 114, the transition to the C phase from the nematic has to take place in the presence of a DC electric field (10 to 50 volts over a couple of microns) across the glass plates, because only the combination of the molecular orientation ($\hat{n}$) and the direction of polarization ($\vec{P}$) will define a unique direction of the smectic layer planes. If also the nematic phase is absent, the transition to the smectic C phase has to be directly from the isotropic phase in which case, again, a strong additional magnetic field (parallel to $\hat{n}$ and perpendicular to E) will be helpful.

The electrode configuration can of course be chosen in a great number of different ways, and the switching properties will also depend on the length scale of the array: for a sufficiently fine array, the switching will be monostable, but it will change to bistable for a sufficiently large array element dimension. For temperatures just below the A-C transition, one can expect the switching to be monostable for small values of the tilt angle $\Psi_o$ and flip to bistable for a $\Psi_o$ greater or equal to a certain value (corresponding to a certain temperature). The SiO treated parts could further be along opaque stripes, like metallic leads, or be on transparent areas.

A third variation of combined surface treatments, leading to a pronounced bistability and memory is shown for a square array in FIG. 30. Here pixels 170, which could be transparent or opaque, conductive or nonconductive, have received SiO treatment favoring horizontal director, thus aligning the A phase layers vertically whereas pixels 172 have received a double SiO treatment favoring each of the two tilt cone directions. If all pixels in the array are transparent and conductive, the two sets will have different switching properties which could be used to minimize crosstalk problems with even very simple addressing schemes.

Although a number of exemplary embodiments of this invention have been described in detail above, those skilled in the art will readily appreciate that many additional modifications are possible in the exemplary embodiments without materially departing from the novel teachings and advantages of this invention. Accordingly, all such modifications are intended to be included within the scope of this invention as defined in the following claims.

What is claimed is:

1. A liquid crystal device comprising:
   a quantity of ferroelectric liquid crystal having a plurality of adjacently disposed layers each comprised of a plurality of molecules, each molecule having a long axis, said molecules of said layers in a bulk of said liquid crystal, forming helices having axes perpendicular to said layers;
   first means, transverse to and contiguous with at least a portion of as surface of said layers, for aligning the long axes of said molecules adjacent to said first means at a first angle $\Omega_1(\alpha)$ from the normal to said first means, said angle $\Omega_1(\alpha)$ being a predetermined function of an angle $\alpha$, said angle $\alpha$ being an angle between a reference vector in a first plane parallel to said first means and a projection of said long axes of said molecules onto said first plane; and
   second means, transverse to and contiguous with at least a portion of an opposite surface of said layers, for aligning the long axes of said molecules adjacent to said second means at a second angle $\Omega_2(\alpha)$ from the normal to said second means, said angle $\Omega_2(\alpha)$ being a predetermined function of $\alpha$ which is different from said function of said angle $\Omega_1(\alpha)$, the distances between said first and second means being less than the distance at which said helices form in the absence of a electric field, said first and second means causing said long axes to assume one of a plurality of stable orientations.

2. A device as in claim 1 wherein said angle $\Omega_1(\alpha)$ is a constant over all said angles $\alpha$ and said angle $\Omega_2(\alpha)$ is a constant over all said angles $\alpha$.

3. A device as in claim 1 wherein said first and second means are parallel.

4. A device as in claim 1 wherein at least one of said angles $\Omega_1(\alpha)$ and $\Omega_2(\alpha)$ is symmetric with respect to a plane perpendicular to said plane within which said angle $\alpha$ lies.

5. A device as in claim 1 wherein at least one of said angles $\Omega_1(\alpha)$ and $\Omega_2(\alpha)$ is undefined for certain values of $\alpha$.

6. A device as in claim 1 wherein said layers are not normal to said first and second means.

7. A device as in claim 1 wherein said first and second means are also for inducing splay in the polarization field of said liquid crystal homogeneously over at least a substantial portion of said first and second means.

8. A device as in claim 1 wherein said first means aligns said long axes more strongly than said second means by a predetermined degree homogeneously over at least a substantial portion of said first and second means.

9. A device as in claim 1 wherein said first and second means are both for inducing unsymmetric anisotropic conical conditions on said long axes but have different directions of anisotropy homogeneously over at least a substantial portion of said first and second means.

10. A device as in claim 1 wherein the distance between said first and second means varies over the area of said first and second means.

11. A device in as in claim 10 wherein said distance varies in discrete steps over the area of said second and second means.

12. A device as in claim 1 wherein a selected substantial portion of said first means aligns said long axes more strongly in a predetermined manner than the remainder of said first means, and said device further comprises electro-optical means for exploiting said selected portion aligning said long axes than said remainder to produce optical effects.

13. A device as in claim 1 further comprising means for heating a portion of said liquid crystal to a sufficient extend to create states different from states in unheated portions of said liquid crystal.

14. A device as in claim 1 further comprising means for applying an electric field to at least a portion of said layers in a direction having a significant component perpendicular to said layers, the strength of said electric field being sufficient to shift said long axes in said portion from one of said stable orientations to another of said stable orientations.

15. A device as in claim 1 wherein said angles $\Omega_1(\alpha)$ and $\Omega_2(\alpha)$ are different from 90 degrees.

16. A device as in claim 1 wherein ferroelectric coupling occurs between a polarization vector of said molecules and at least one of said first and second means, said coupling being sufficiently weak to enable switching between a plurality of stable while favoring certain of said stable states.

17. A device as in claim 1 wherein:
said first and second means extend over a portion of said liquid crystal; and
said device further comprises means, contioguous with said liquid crystal portion over which said first and second means do not extend, for aligning said layers at a predetermined angle δ relative to said layer aligning means, wherein δ is the angle between the layer aligning means and said layers of said liquid crystal.

18. A device as in claim 17 wherein said layer aligning means includes silicon monoxide obliquely deposited on a surface from a predetermined direction.

19. A liquid crystal electro-optical device comprising:
a quantity of ferroelectric liquid crystals having a plurality of adjacently disposed layers each comprised of a plurality of molecules, each molecule having a long axis, said molecules of said layers in a bulk of said liquid crystal forming helices having axes perpendicular to said layers;
first means, transverse to and continguous with a surface of said layers for aligning the long axes of said molecules adjacent to said first means at a first angle $\Omega_1(\alpha)$ from the normal to said first means, said angle $\Omega_1(\alpha)$ being predetermined function of an angle $\alpha$, said angle $(\alpha)$ being an angle between a reference vector in a first plane parallel to said frist means and a projection of said long axes of said molecules onto said first plane;
second means, transverse to and contiguous with an opposite surface of said layers, for aligning the long axes of said molecules adjacent to said second means at a second angle $\Omega_2(\alpha)$ from the normal to said second means, said angle $\Omega_2(\alpha)$ being a predetermined function of $\alpha$ which is different from said function of said angle $\Omega_1(\alpha)$ the distance between said first and second means being less than the distance at which said helices form in the absence of an electric field, said first and second means causing said long axes to assume one of a plurality of stable orientations;
means for applying an electric field to at least a portion of said layers, said electric field having a significant component parallel to said layers, and for reversing the direction of said electric field, the strength of said electric field being sufficient to shift the long axes of molecules in said portion of said layers from one of said stable orientations to another of said stable orientations; and
means for processing light passing through said liquid crystal so that light passing through a portion of said liquid crystal having one of said stable orientations can be distinguished from light passing through said same portion of said liquid crystal having other of said stable orientations.

20. A device as in claim 19 wherein said first angle $\Omega_1(\alpha)$ is a constant over all of said angles $\alpha$ and said second angle $\Omega_2(\alpha)$ is a constant over all of said angles $\alpha_2$.

21. A device as in claim 19 wherein said first and second means are parallel.

22. A device as in claim 21 wherein said processing means employs birefringence of said liquid crystal.

23. A device as in claim 21 wherein said processing means employs the anisotropic absorption of light by said liquid crystal.

24. A device as in claim 23 further comprising dye molecules mixed with said liquid crystal.

25. A device as in claim 19 wherein the orientation of said long axes varies linearly with said electric field.

26. A device as in claim 20 wherein said processing means includes first ends second polarizers, on opposite sides of said liquid crystal, having polarization directions perpendicularly arranged, one of said polarization directions being parallel to said long axes in one of said stable orientations.

27. A device as in claim 19 wherein said processing means includes a polarizer and a reflector, both disposed parallel to a surface of said liquid crystal.

28. A device as in claim 27 wherein said polarizer and said reflector are on opposite sides of said liquid crystal.

29. A device as in claim 27 wherein said polarizer and reflector are on the same side of said liquid crystal.

30. A device as in claim 27 wherein said processing means includes a second polarizer parallel to said reflector.

31. A device as in claim 19 further comprising third means and another ferroelectric liquid crsytal disposed between said second means and said third means, said third means for aligning the long axes of molecules of said another liquid crystal adjacent to said third means at an angle $\Omega_3(\alpha)$ from the normal to said third means, said angle $\Omega_3(\alpha)$ being a predetermined function of said angle $\alpha$, the distance between said second means and said third means being less than the distance at which said helices form in the absence of an electric field.

32. A device as in claim 19 wherein:
different areas of said liquid crystal can assume different orientations; and
said processing means includes optical means for combining light passing through different areas of said liquid crystal.

33. A device as in claim 32 wherein said optical means includes a cylindrical lens.

34. A device as in claim 19 wherein each of said first means and said second means are displaced from portions of said surfaces of said liquid crystal on which said applying means is disposed.

35. A device as in claim 19 wherein:
said first and second means extend over a portion of said liquid crystal; and
said device further comprises means, contiguous with said liquid crystal portion over which said first and second means do not extend, for aligning said layers.

36. A device as in claim 35 wherein said layer aligning means includes silicon monoxide obliquely deposited on a surface from a predetermined direction.

37. A device as in claim 19 wherein said liquid crystal is such that torques induced by said field from dielectric effects dominate over torques induced by ferroelectric effects.

38. A liquid crystal electro-optical device comprising:
a quantity of ferroelectric liquid crystals having a plurality of adjacently disposed layers each comprised of a plurality of molecules, each molecule having a long axis, said molecules of said layers in a bulk of said liquid crystal forming helices having axes perpendicular to said layers;

first means, transverse to and contiguous with a surface of said layers and capable of assuming any of a plurality of structural states, for aligning the long axes of said molecules adjacent to said first means at a first angle $\Omega_1(\alpha)$ from the normal to said first means, said angle $\Omega_1(\alpha)$ being a predetermined function of both an angle $\alpha$ and the structural state of said first means, said angle $\alpha$ being an angle between a reference vector in a first plane parallel to said first plane;

second means, transverse to and contiguous with an opposite surface of said layers, for aligning the long axes of said molecules adjacent to said second means at a second angle $\Omega_2(\alpha)$ from the normal to said second means, said angle $\Omega_2(\alpha)$ being a function of said angle $\alpha$, the distance between said first and second means being less than the distance at which said helices form in the absence of an electric field, said first and second means causing said long axes to assume one of as plurality of stable orientations;

means for applying an electric field to at least a portion of said layers, said electric field having a significant component parallel to said layers, and for reversing the direction of said electric field, the strength of said electric field being sufficient to shift the long axes of molecules in said portion and to alter said structural state of said first means to produce a shift in the long axes in said portion from one of said stable orientations to another of said stable orientations; and means for processing light passing through said liquid crystal so that light passing through a portion of said liquid crystal having one of said stable orientations can be distinguished from light passing through said same portion of said liquid crystal having other of said stable orientations.

39. A liquid crystal electro-optical device comprising:

a quantity of ferroelectric liquid crystal having a plurality of adjacently disposed layers each comprised of a plurality of adjacently disposed layers each comprised of a plurality of molecules, each molecule having a long axis and a ferroelectric polarization vector parallel to said layers, said moles forming helices having axes perpendicular to said layers;

first and second means, transverse to and contiguous with said layers, for containing said liquid crystal, at least one of said first and second means for ferroelectrical coupling with and aligning said polarization vectors of said molecules adjacent to said at least one of said first and second means at a predetemrined angle with respect to said first and second means, the distance between said first and second means being less than the distance at which said helices form in the asbsence of an electric field, said first and second means causing said long axes to assume a stable orientation;

means for applying an electric field to at least a portion of said layers, said field being perpendicular to said first and second means, the strength of said field being sufficient to shift said long axes of said molecules from said stable orientation to a different orientation; and means for processing light passing through said liquid crystal so that light passing through portions of said liquid crystal having said stable orientation can be distinguished from light passing through portions of said liquid crystal having said different orientation.

40. A device as in claim 39 wherein said liquid crystal is any one of the group consisting of S-4-(6-methyl)octylresorcyidene-4'-octylaniline and bis (S,S-4'-(6-methyl)-2-chloro-1,4-phenylenediamine and at least one of said first and second means includes an indium-tin oxide coated glass surface.

41. A device as in claim 39 wherein said electric field having a first polarity causes a first different orientation and said electric field having a second polarity causes a second different orientation from said stable orientation.

42. A liquid crystal device comprising:

a quantity of ferroelectric liquid crystal having a plurality of adjacently disposed layers each comprised of a plurality of molecules, each molecules having a long axis, said molecules of said layers in a bulk of said liquid crystal forming helices having axes perpendicular to said layers; and first and second means each transverse to and contiguous with said layers, for containing said liquid crystal, at least said first means aligning the long axes of said molecules adjacent thereto at an angle $\Omega(\alpha)$ from the normal to said first means, said angle $\Omega(\alpha)$ being a predetermined function of an angle and undefined for certain values of $\alpha$, said angle $\alpha$ being an angle between a reference vector in a plane parallel to said first means and a projection of said long axes of said molecules onto said plane, the distance between said first and second means being less than the distance at which said helices form in the absence of an electric field, said first and second means causing said long axes to assume one of a plurality of stable orientations.

43. A liquid crystal device comprising:

a quantity of ferroelectric liquid crystal having a plurality of adjacently disposed layers each comprised of a plurality of molecules, each molecule having a long axis, said moles of said layers in a bulk of said liquid crystal forming helices having axes perpendicular to said layers; and first and second means, each transverse to and contiguous with said layers, for containing said liquid crystal, at least said first means aligning the long axes of said moles adjacent thereto at an angle $\Omega(\alpha)$ from the normal for said first means, said angle $\Omega(\alpha)$ being a predetermined function of an angle $\alpha$, said angle $\alpha$ being an angle between a reference vector in a plane parallel to said first means and a projection of said long axes of said molecules onto said plane, the distance between said first and second means being less than the. distance at which said helices form in the absence of an electric field, said first and second means causing said long axes to assume one of a plurality of stable orientations, said first and second means also for inducing splay in the polarization field of said liquid crystal homogeneously over at least a substantial portion of said first and second means.

44. A liquid crystal device comprising:

a quantity of ferroelectric liquid crystal having a plurality of adjacently disposed layers each comprised of a plurality of molecules, each molecule having a long axis, said molecules of said layers in a bulk of said liquid crystal forming helices having axes perpendicular to said layers; and first and second means, each transverse to and continuous with said layers, for containing said liquid crystal, at least said first means aligning the long axes of said molecules adjacent thereto at an angle $\Omega(\alpha)$ from the normal to said first means, said angle $\Omega(\alpha)$ being a predetermined function of an angle $\alpha$, said angle $\alpha$ being an angle between a reference vector in a plane parallel to said first means and a projection of said long axes of said molecules onto said plane, the distance between said first and second means being less than the distance at which said helices form in the absence of an electric field, said first and second means causing said long axes to assume one of a plurality of stable orientations, said second means also for aligning the long axes of said molecules adjacent thereto but not as strongly as said first means align said molecules adjacent thereto homogeneously over at least a substantial portion of said first and second means.

45. A liquid crystal device comprising:
a quantity of ferroelectric liquid crystal having a plurality of adjacently disposed layers each comprised of a plurality of molecules, each molecule having a long axis, said molecules of said layers in a bulk of said liquid crystal forming helices having axes perpendicular to said layers; and first and second means, each transverse to and contiguous with said layers, for containing said liquid crystal, at least said first means aligning the long axes of said moles adjacent thereto at an angle $\Omega(\alpha)$ from the normal to said first means, and angle $\Omega(\alpha)$ being a predetermined function of an angle $\alpha$, said angle $\alpha$ being angle between a reference vector in a plane parallel to said first means and a projection of said long axes of said molecules onto said plane, the distance between said first and second means being less than the distance at which said helices form in the absence of an electric field, said first and second causing said long axes to assume one of a plurality of stable orientations, said first and second means both also for inducing unsymmetric anisotropic conical conditions on said long axes but having different directions of anisotropy homogeneously over at least a substantial portion of said first and second means.

46. A liquid crystal device comprising:
a quantity of ferroelectric liquid crystal having a plurality of adjacently disposed layers each comprised of a plurality of molecules, each molecule having a long axis, said molecules of said layers in a bulk of said liquid crystal forming helices having axes perpendicular to said layers; and first and second means, each transverse to and contiguous with said layers, for containing said liquid crystal, at least said first means aligning the long axes of said moles adjacent thereto at an angle $\Omega(\alpha)$ from the normal to said first means, said angle $\Omega(\alpha)$ being a predetermined function of an angle $\alpha$, said angle $\alpha$ being an angle between a reference vector in a plane parallel to said first means and a projection of said long axes of said molecules onto said plane, a selected substantial portion of said first means aligning said long axes more strongly than the remainder of said first means in a predetermined manner, the distance between said first and second means being less than the distance at which said helices form in the absence of an electric field, said first and second means causing said long axes to assume one of a plurality of stable orientations.

47. A liquid crystal device comprising:
a quantity of ferroelectric liquid crystal having a plurality of adjacently disposed layers each comprised of a plurality of molecules, each molecule having a long axis said molecules of said layers in a bulk of said liquid crystals forming helices having axes perpendicular to said layers; and first and second means, each transverse to and contiguous with said layers, for containing said liquid crystal, at least said first means aligning the long axes of said molecules adjacent thereto at an angle $\Omega(\alpha)$ from the normal to said first means, said angle $\Omega(\alpha)$ being a predetermined function of an angle $\alpha$, said angle $\alpha$ being an angle between a reference vector in a plane parallel to said first means and a projection of said long axes of said molecules onto said plane, the distance between said first and second means being less than the distance at which said helices form in the absence of an electric field, said first and second means causing said long axes to assume one of a plurality of stable orientations, said molecules and at least said second means each having polarization vectors, coupling between said polarization vectors being sufficiently weak to enable switching between a plurality of stable states while favoring certain of said stable states.

* * * * *